United States Patent
Dupuis et al.

(10) Patent No.: US 11,206,418 B2
(45) Date of Patent: Dec. 21, 2021

(54) METHOD OF IMAGE ENCODING AND FACILITY FOR THE IMPLEMENTATION OF THE METHOD

(71) Applicant: ATEME, Velizy Villacoublay (FR)

(72) Inventors: Etienne Dupuis, Le Pecq (FR); Mathieu Monnier, Paris (FR); Jean-Marc Thiesse, Saint Cloud (FR); Pierre Larbier, Bievres (FR)

(73) Assignee: ATEME, Velizy Villacoublay (FR)

( * ) Notice: Subject to any disclaimer, the term of this patent is extended or adjusted under 35 U.S.C. 154(b) by 20 days.

(21) Appl. No.: 15/741,304

(22) PCT Filed: Jun. 30, 2016

(86) PCT No.: PCT/FR2016/051654
§ 371 (c)(1),
(2) Date: Jan. 2, 2018

(87) PCT Pub. No.: WO2017/001793
PCT Pub. Date: Jan. 5, 2017

(65) Prior Publication Data
US 2018/0192070 A1    Jul. 5, 2018

(30) Foreign Application Priority Data

Jul. 1, 2015 (FR) .................................. 15 56211

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/103* (2014.11); *H04N 19/105* (2014.11);
(Continued)

(58) Field of Classification Search
CPC ...... H04N 19/513; H04N 19/70; H04N 19/59; H04N 19/176; H04N 19/85; H04N 19/523;
(Continued)

(56) References Cited

U.S. PATENT DOCUMENTS

2012/0281927 A1* 11/2012 Arai ..................... H04N 13/194
382/233
2013/0301946 A1* 11/2013 Rossato ................ H04N 19/30
382/236
(Continued)

FOREIGN PATENT DOCUMENTS

EP  2 685 739 A1  1/2014
FR  2 925 815 A1  6/2009

OTHER PUBLICATIONS

Dongdong Zhu et al: "Fast inter prediction mode decision for H.264", 2004 IEEE International Conference on Multimedia and Expo : Jun. 27-30, 2004, Taipei, Taiwan, IEEE Operations Center, Piscataway, NJ, vol. 2, Jun. 27, 2004 (Jun. 27, 2004), pp. 1123-1126, XP010771021, ISBN: 978-0-7803-8603-7, DOI: 10.1109/ICME.2004.1394414.
(Continued)

*Primary Examiner* — Nasim N Nirjhar
(74) *Attorney, Agent, or Firm* — Nixon & Vanderhye

(57) ABSTRACT

Disclosed is a method of encoding a video sequence according to a first set of encoding parameters is presented, including redimensioning the video sequence, generating encoding data of the redimensioned video sequence according to a second set of encoding parameters, determining first encoding data of the video sequence by respective scale transposition of encoded data generated for the redimensioned video sequence, determining, for at least one encoding block of an image of the video sequence, respective pixel residuals from predictive coding data obtained by encoding
(Continued)

the redimensioned video sequence applying a block transformation to the pixel residuals determined, and inserting the transformed pixel residuals and the first encoding data into a binary encoding stream of the video sequence.

13 Claims, 10 Drawing Sheets

(51) Int. Cl.

| | |
|---|---|
| *H04N 19/176* | (2014.01) |
| *H04N 19/119* | (2014.01) |
| *H04N 19/61* | (2014.01) |
| *H04N 19/182* | (2014.01) |
| *H04N 19/523* | (2014.01) |
| *H04N 19/194* | (2014.01) |
| *H04N 19/85* | (2014.01) |
| *H04N 19/103* | (2014.01) |
| *H04N 19/59* | (2014.01) |
| *H04N 19/70* | (2014.01) |
| *H04N 19/33* | (2014.01) |
| *H04N 19/40* | (2014.01) |

(52) U.S. Cl.
CPC ......... *H04N 19/119* (2014.11); *H04N 19/176* (2014.11); *H04N 19/182* (2014.11); *H04N 19/194* (2014.11); *H04N 19/523* (2014.11); *H04N 19/59* (2014.11); *H04N 19/61* (2014.11); *H04N 19/70* (2014.11); *H04N 19/85* (2014.11); *H04N 19/33* (2014.11); *H04N 19/40* (2014.11)

(58) Field of Classification Search
CPC .. H04N 19/105; H04N 19/194; H04N 19/182; H04N 19/103; H04N 19/61; H04N 19/119; H04N 19/40; H04N 19/33
See application file for complete search history.

(56) References Cited

U.S. PATENT DOCUMENTS

| | | | | |
|---|---|---|---|---|
| 2014/0192860 A1* | 7/2014 | Onno | ..................... | H04N 19/30 375/240.02 |
| 2015/0043641 A1* | 2/2015 | Gamei | ................. | H04N 19/122 375/240.12 |
| 2015/0350686 A1 | 12/2015 | Zhou et al. | | |
| 2016/0014411 A1* | 1/2016 | Sychev | ................. | H04N 19/50 375/240.12 |

OTHER PUBLICATIONS

De H. Li et al.: "Fast Mode Decision for Spatial Scalable Video Coding", IEEE International Symposium on Circuits and Systems, Island of Kos, Greece, May 2006 (May 1, 2006).

Siu W C et al: "On the architecture of H.264 to H.264 homogeneous transcoding platform", Neural Networks and Signal Processing, 2008 International Conference on, IEEE, Piscataway, NJ, USA, Jun. 7, 2008 (Jun. 7, 2008), pp. 654-659, XP031298782, ISBN: 978-1-4244-2310-1.

De Wolf K et al: "Comparison of prediction schemes with motion information reuse for low complexity spatial scalability", Visual Communications and Image Processing; Jul. 12-15, 2005; Beijing Jul. 12, 2005 (Jul. 12, 2005), XP030081036.

Chih-Hung Kuo et al: "Fast inter-prediction mode decision and motion search for H.264", 2004 IEEE International Conference on Multimedia and Expo : Jun. 27-30, 2004, Taipei, Taiwan, IEEE Operations Center, Piscataway, NJ, vol. 1, Jun. 27, 2004 (Jun. 27, 2004), pp. 663-666, XP010770898, ISBN: 978-0-7803-8603-7, DOI: 10.1109/ICME.2004.1394279.

International Search Report, dated Sep. 28, 2016, from corresponding PCT/FR2016/051654 application.

Bergen et al, "Hierarchical model-based motion estimation," Computer Vision-ECCV'92, Springer, Berlin, Heidelberg, 1992, p. 237-252.

Dhollande et al., "HEVC intra coding of Ultra HD video with reduced complexity," IEEE International Conference on Image Processing 2014 (ICIP 2014), Oct. 2014, Paris, France, pp. 4122-4126.

Dai et al., "Fast mode decision for inter prediction in H.264," in IEEE International Conference on Image Processing (ICIP), Singapore, Oct. 2004, vol. 1, pp. 119-122.

Sullivan et al., "Overview of the High Efficiency Video Coding (HEVC) Standard," IEEE Transactions on Circuits and Systems for Video Technology, vol. 22, No. 12, Dec. 2012, pp. 1649-1668.

* cited by examiner

METHOD OF IMAGE ENCODING AND FACILITY FOR THE IMPLEMENTATION OF THE METHOD

BACKGROUND OF THE INVENTION

The present invention relates to a method of image encoding and a device for implementing this method. It applies in particular to coding images of a video stream.

The video data is in general subjected to source coding to compress it in order to limit the resources required for transmitting and/or storing it. There are many coding standards, such as H.264/AVC, H.265/HEVC, and MPEG-2, which may be used for this purpose.

A video stream comprising a set of images is considered. In conventional coding schemes, the images of the video stream to be encoded are typically considered according to an encoding sequence, and are each divided into sets of pixels which are also processed sequentially, for example starting on the top left and finishing on the bottom right of each image.

Encoding an image of the stream is thus performed by dividing a pixel matrix corresponding to the image into several sets, for example into blocks with a fixed size of 16×16, 32×32, or 64×64 pixels, and by encoding these blocks of pixels according to the given processing sequence. Some standards, such as H.264/AVC, provide the possibility of decomposing blocks of 16×16 pixels (here referred to as macro-blocks) into sub-blocks, for example with a size of 8×8 or 4×4, so as to perform the encoding processing with a finer granularity. The H.265/HEVC standard provides for the use of blocks with a fixed size up to 64×64 pixels, wherein these blocks may be partitioned to a minimum size of 8×8 pixels.

The existing techniques of video compression may be divided into two large categories: on the one hand the so-called "Intra" compression, in which the compression processing is made on pixels from a single image or video frame, and on the other hand the so-called "Inter" compression, in which the compression processing is made on several images or video frames. In the Intra mode, processing a block (or set) of pixels typically comprises predicting the pixels from the block performed using causal (previously coded) pixels which are found in the image being encoded (so-called "current image"), in which case it is referred to as "Intra prediction". In the Inter mode, processing a block (or set) of pixels typically comprises predicting the pixels from the block performed using pixels derived from previously coded images, in which case it is referred to as "Inter prediction" or "motion compensation".

These two coding types are used within so-called "hybrid" coding schemes, which are specified in existing video codecs (MPEG2, H.264/AVC, HEVC) and are described for the HEVC (High Efficiency Video Coding) codec in the article entitled «Overview of the High Efficiency Video Coding (HEVC) Standard», by Gary J. Sullivan et al., IEEE Transactions on Circuits and Systems for Video Technology, vol. 22, No. 12, December 2012.

This use of spatial and/or temporal redundancy prevents transmitting or storing the pixel value from each block (or set) of pixels, by representing at least some of the blocks by a pixel residual representing the difference (or the distance) between the predictive pixel values from the block and the real pixel values from the predicted block.

The pixel residuals information is found in the data generated by the encoder after transform (for example, Discrete Cosine Transform, DCT) and quantization in order to reduce the entropy of the data generated by the encoder.

It is desirable to reduce as much as possible the additional information generated by predicting the pixels and output by the encoder in order to increase the efficiency of the coding/compression scheme to a given level of distortion. Conversely, it may also be intended to reduce the additional information in order to increase the efficiency of the coding/compression scheme to a given level of output rate of the encoder.

The video encoder typically performs a choice of encoding mode corresponding to a selection of encoding parameters for a processed set of pixels. This decision may be developed by optimizing a rate and distortion metric, the encoding parameters selected by the encoder being the ones minimizing a rate-distortion criterion. The choice of encoding mode then has an impact on the performance of the encoder, in terms of gain in both rate and visual quality.

The HEVC video compression standard issued in 2013 brings a significant improvement of performances with respect to previous standards, in terms of reducing the output rate with consistent visual quality, at the cost of an increase in processing complexity. This results, in particular, in the compression time for 4K video sequences (also called UHD-1) (3840×2160 pixels) being currently incompatible with real-time processing.

Various techniques of accelerating decision algorithms have been presented, such as for example the so-called SAD or SATD techniques which use less complex so-called "objective" decision (distortion or rate) metrics, such as the Sum of Absolute Differences, SAD, or the Mean Square Error, MSE, the so-called "early exit" technique in which the cancelling conditions for a decision are developed depending on empirical parameters, or the restriction in the number of choices for competitive coding.

However, a bad choice in the coding mode may lead to artifacts resulting in degradation in the visual quality perceived. The calculus methods depending on the rate-distortion optimization certainly allow reducing the output rate of the encoder, nonetheless sometimes at the expense of visual rendering.

Acceleration techniques mentioned hereabove thus degrade compression quality, which, facing the increase in the number of pixels to be processed (ultra HD, high frame rate, 3D, etc.) raises the issue of the necessity for accelerating the coding mode decision with better performances in terms of compression quality.

There is thus a need for a method of image encoding improved in terms of accelerating the processing time and compression quality.

SUMMARY OF THE INVENTION

An objective of the present invention is to propose a method of image encoding improved in terms of accelerating the processing time and compression quality.

Another objective of the present invention is to propose a method of image encoding improved in terms of accelerating the encoding time according to the HEVC standard of 4K video sequences at higher resolution.

Another objective of the present invention is to propose an improved method of image encoding allowing real-time encoding according to the HEVC standard of 4K video sequences at higher resolution.

According to a first aspect, a method of encoding a first set of images of the video sequence according to a first set of encoding parameters is proposed, comprising: reducing the size of images of the first set of images depending on a scale factor for generating a second set of images corresponding to the video sequence; generating, for each image of the second set of images, second encoding data according to a first set of encoding parameters; determining, for each image of the first set of images, first encoding data by respective scale transposition, depending on the scale factor, second encoding data generated for the corresponding image in the second set of images, the first encoding data comprising first partitioning data defining a partitioning of the image into encoding blocks and first predictive coding data of the encoding blocks derived from the partitioning; determining, for at least one encoding block of an image of the first set of images, respective pixel residuals representing a distance between the pixels of the encoding block and the pixels of the prediction block of the encoding block determined from the predictive coding data obtained for the encoding block by scale transposition of the second encoding data; applying, for the at least one encoding block of an image of the first set of images, a block transformation to the pixel residuals determined for the encoding block, and inserting the transformed pixel residuals and the first encoding data in a binary encoding stream of the first set of images.

For a so-called "original" encoding of a video sequence, the method proposed advantageously uses some encoding parameters determined during the encoding of a redimensioned version of the original video sequence, by transposing these encoding parameters in order to directly generate, i.e. without executing again an algorithm for determining these parameters on the original video sequence, corresponding encoding parameters for the original video sequence.

Advantageously, the second set of encoding parameters may contain at least one second parameter which is not in the first set of encoding parameters, the second set of parameters comprising at least one first parameter corresponding to a scale transposition depending on the scale factor applied to the second parameter.

Using different sets of parameters for encoding an original video sequence and its redimensioned version according to a scale factor allows providing for the encoding of the redimensioned version using encoding parameters which are not available for encoding the original version, and corresponding, after scale transposition, to one of the available parameters for encoding the original version, so as to use a larger number of these available parameters.

This may for example be the case of the partitioning parameters for the images of a video stream to be encoded into encoding blocks. In a particular embodiment of the method proposed, the second encoding data comprises, for a current image of the second set of images, second partitioning data, the method further comprising: determining, according to a set of partitioning parameters included in the second set of encoding parameters, a partitioning of the current image into encoding blocks, and generating the second partitioning data depending on the determined partitioning; determining the first partitioning data by scale transposition of the second partitioning data.

This may also be the case of predictive coding parameters for the encoding blocks. In a particular embodiment of the method proposed, the second encoding data further comprises, for the current image, second predictive coding data, the method further comprising: for each encoding block derived from the partitioning of the current image, determining, according to a set of predictive coding parameters, a predictive coding mode, and generating the second predictive coding data depending on the determined coding mode; determining the first predictive coding data by scale transposition of the second predictive coding data.

This may also be the case of parameters for block transformation which may be applied to pixel residuals determined by predictive coding. In a particular embodiment of the method proposed, the second encoding data further comprises, for a current image of the second set of images, block transformation data, the method further comprising: for each encoding block derived from a partitioning of the current image, selecting, in a set of block transformation parameters, block transformation parameters for applying a block transform to the encoding block, and generating first block transformation data depending on the selected transformation parameter; determining, for each encoding block of each image of the first set of images, second block transformation data by scale transposition, depending on the scale factor, of the first block transformation data; and applying, on the determined pixel residuals for the encoding block, the block transformation depending on the second block transformation data.

In a particular embodiment of the method proposed, the second set of encoding parameters comprises a set of partitioning parameters, a set of predictive coding parameters, a set of coding parameters for bidirectional prediction by temporal correlation, and a set of block transformation parameters, and wherein the second set of encoding parameters comprises at least one second parameter from the partitioning parameters, the predictive coding parameters, the coding parameters for bidirectional prediction by temporal correlation, and the block transformation parameters, which is not in the first set of encoding parameters, the first set of parameters comprising at least one first parameter corresponding to a scale transposition depending on the scale factor applied to the second parameter.

In a particular embodiment of the method proposed, the second parameter is a partitioning parameter related to the minimum size of the encoding blocks used for defining a partitioning.

In a particular embodiment of the method proposed, the second parameter is a predictive coding parameter according to the coding mode for prediction by motion compensation using the motion vector pointing to a separate image of the current image and the second set of images with a precision of an eighth of a pixel.

In a particular embodiment of the method proposed, the second parameter is the block transformation parameter related to the minimum usable block size for performing the block transformation of an encoding block.

In a particular embodiment of the method proposed, the second parameter is a block size parameter for the predictive coding according to a coding mode of motion compensation bidirectional predictive type and using the first and second motion vectors pointing to the first and second separate images of a current image in the second set of images, respectively.

In a particular embodiment of the method proposed, the first set of encoding parameters corresponds to encoding the first set of images according to High Efficient Video Coding, HEVC, standard.

According to a second aspect, a device for encoding a first set of images of a video sequence according to a first encoding parameter set is proposed, comprising an input interface configured for receiving the first set of images of the video sequence, a video stream encoding unit, operationally coupled to the input interface, and configured for encoding the first set of images according to the first set of encoding parameters using the method proposed.

According to another aspect, a computer program is proposed, being chargeable in a memory associated with a processor, comprising code portions for performing the steps of the method proposed during execution of said program by the processor, as well as a data set representing, e.g. via a compression or encoding path, said computer program.

Another aspect relates to a non-transitory storage medium for a program which is executable by a computer, comprising a data set representing one or more programs, said one or more programs comprising instructions for, during execution of said one or more programs by a computer comprising a processing unit operationally coupled to memory means and to an input/output interface module, leading the computer to encode a first set of images of a video sequence according to a first set of encoding parameters according to the method proposed.

The method proposed is particularly suitable, although not exclusively, for encoding or compressing an image of a sequence of images according to a High Efficiency Video Coding, HEVC, or Scalable HEVC, SHVC, scheme. However, it is also suitable for encoding images according to any video encoding scheme operating on images which are divided into blocks in which the blocks are encoded according to a plurality of coding modes comprising at least one coding mode of prediction by temporal correlation using a plurality of images from the video stream to be encoded.

The method proposed may advantageously be carried out in cases where the coding mode of prediction by temporal correlation using a plurality of images from the set of images is using motion prediction from the previously coded images (the type of coding mode referred to in some video coders as "Inter") or using a predetermined predictor vector selected from blocks adjacent to the previously coded current block (the type of coding mode being referred to, in some video coders, as "Skip" and "Merge").

BRIEF DESCRIPTION OF THE DRAWINGS

Other characteristics and advantages of the present invention will appear in the following description of non-limiting embodiments, with reference to the attached drawings, wherein:

FIGS. 2a, 2b, and 2c are schematic views illustrating the Intra prediction modes;

DETAILED DESCRIPTION OF THE PREFERRED EMBODIMENTS

In the following detailed description of an embodiment of the invention, several specific details are presented so as to bring a more complete understanding. However, the person skilled in the art may realize that some embodiments may be put into practice without these specific details. In other cases, well-known characteristics are not described in details to avoid needlessly complicating the description.

In the following, the terms "pixel" and "sample" are used indifferently to identify an element of a digital image.

The method proposed may be implemented by any type of image encoder for a set of images, such as for example a video codec in compliance with H.264/AVC, H.265/HEVC, and/or MPEG-2 standards.

Figure 1:
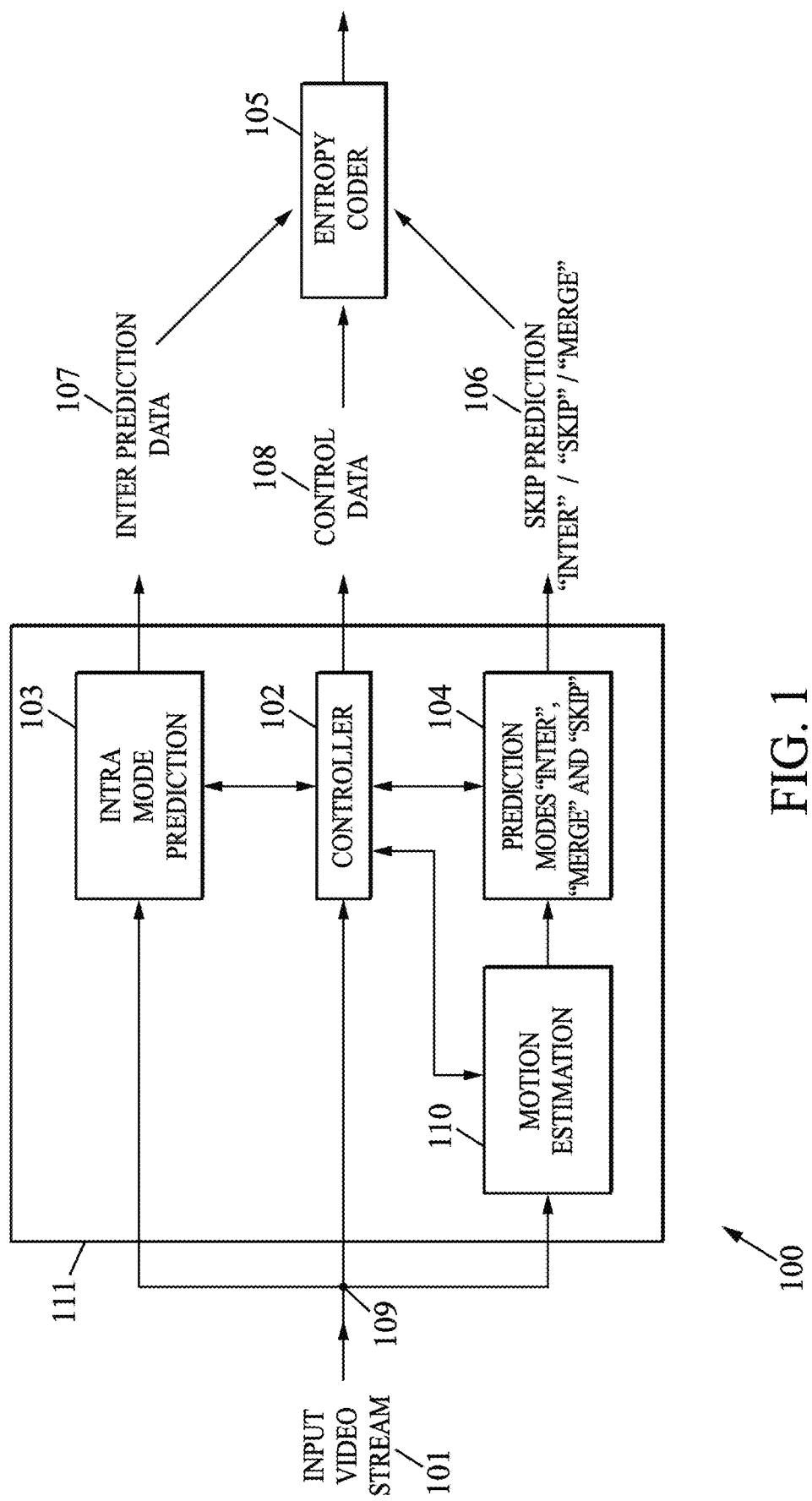
FIG. 1 is a schematic view illustrating the architecture of a coder for implementing the method proposed.

In the schematic view of the compression illustrated in FIG. 1, the images are considered sequentially and divided into sets of pixels processed sequentially starting from the top left and finishing on the bottom right. These sets of pixels are named "coding units" in HEVC standard, and have of maximum size of 64×64 pixels, coding units of this size being called "Large Coding Units, FCU". These sets of pixels are predicted using causal (previously coded) pixels found in the current image ("Intra" prediction), or using pixels resulting from one or several previously coded images ("Inter" prediction). This use of spatial and temporal redundancy allows representing the coding units by the lowest possible pixel residual which is then transmitted to the decoder, optionally after transform and quantization.

With reference to FIG. 1, the encoder 100 receives as an input 109 an input video stream 101 comprising a plurality of images to be processed in order to encode the stream. The encoder 100 comprises a controller 102, coupled operationally to the input 109 interface, which navigates a motion estimation unit 110 and a prediction unit 104 for Inter, Merge, and/or Skip predictions (described hereafter), as well as the Intra mode prediction unit 103. The data received on the input 109 interface is input into the Intra mode prediction 103, motion estimation 110, Inter/Merge/Skip prediction 104 units and into the controller 102. The set composed of the controller 102, the motion estimation unit 110, the prediction unit 104 for Inter/Merge/Skip predictions, and Intra mode predictions 103 forms an encoding unit 111 coupled operationally to the input 109 interface.

The Intra mode prediction unit 103 generates Intra prediction data 107 which is input in an entropy coder 105. The motion estimation unit 110, on the other hand, generates motion estimation data provided to the controller 102 and the Inter/Merge/Skip mode prediction unit 104 for the requirements of the Inter, Merge, and/or Skip mode prediction. The Inter/Merge/Skip mode prediction unit 104 generates Inter, Merge, or Skip prediction data input in the entropy coder 105. For example, the data input in the decoder for Inter prediction may comprise a pixel residual and information relating to one or several motion vectors. This information relative to one or several motion vectors may comprise one or several indices identifying a predictor vector from a list of predictor vectors known to the decoder. The data input in the decoder for Skip prediction typically does not include pixel residuals, and may thus comprise information identifying the predictor vector from a list of predictors known to the decoder. The list of predictor vectors used for Inter coding are not necessarily be identical to the list of predictor vectors used for Skip coding. The controller 102 generates control data 108 which is also input in the entropy coder 105.

The controller 102 is configured to navigate the Intra mode prediction unit 103 and the Inter/Merge/Skip mode prediction unit 104 in order to control the prediction data which is input in the entropy coder 105 by the Intra mode prediction unit 103 and the Inter/Merge/Skip mode prediction unit (104), respectively. Depending on the encoding scheme implemented by the encoder 100, the controller 102 may be further configured to select, among different types of prediction modes (Intra mode, Inter mode, Merge mode, or Skip mode depending on the coding modes developed in the encoding unit 111), the one for which the prediction data is transmitted to the entropy coder 105. Thus, the encoding scheme may comprise a decision for each set of images processed to choose the type of prediction for which the data is transmitted to the entropy coder 105. This choice is typically implemented by the controller, to decide whether to apply the Inter prediction mode, the Intra prediction mode, the Merge prediction mode, or the Skip prediction mode to the block (or the coding unit) being processed. This allows controlling the sending of Intra prediction data 107 or Inter, Merge, or Skip prediction data (106) to the entropy coder depending on the decision taken by the controller 102.

The encoder 100 may be a computer, a computer network, an electronic component, or another device comprising a processor which is operatively coupled to a memory, as well as, according to the chosen embodiment, a data storage unit, and other associated material elements such as a network interface and a support drive for reading a separable storage medium and writing on such medium (not represented in the figure). The separable storage medium may be, for example, a compact disc (CD), a digital video/versatile disc (DVD), a flash disc, a USB key, etc. Depending on the embodiment, the memory, the data storage unit, or the separable storage medium contains instructions which, when executed by the controller 102 require that this controller 102 performs or controls the input interface parts 109, the Intra mode prediction 103, the Inter/Merge/Skip mode prediction 104, the motion estimation 110, and/or data processing of the examples of implementation for the method proposed as described herein. The controller 102 may be a component developing a processor or a calculus unit for encoding images according to the method proposed and controlling the units 109, 110, 103, 104, 105 of the encoder 100.

Furthermore, the encoder 100 may be implemented as a software, as described hereafter, in which case it takes the form of a program executable by a processor, or as a hardware, such as an application specific integrated circuits (ASIC), a system on chip (SOC), or as combination of hardware and software elements, such as a software program intended to be loaded and executed on a FPGA (Field Programmable Gate Matrix) component. The SOCs (Systems On Chip) are embedded systems integrating all the components of an electronic system in a single chip. An ASIC (Application Specific Integrated Circuit) is a specialized electronic circuit gathering the functionalities customised for a given application. The ASICs are generally configured during the manufacturing and may be only the simulated by the user. The programmable logical FPGA (Field Programmable Gate Matrix) circuits are electronic circuits which are reconfigurable by the user.

An encoder may also use hybrid architectures, such as for example architectures depending on a CPU+FPGA, a GPU (Graphics Processing Unit) or a MPPA (Multi-purpose Processor Area).

The image being processed is divided into encoding blocks or coding units (CU), having a form and a size determined based, in particular, on the size of the pixel matrix representing the image, for example into 16×16 pixels square macroblocks. Thus, a set of blocks is formed for which a processing sequence is defined (also called "processing route"). In the case of square blocks, the processing of the current image may for example be processed starting by the one located on the top left of the image, followed by the one immediately on the right of the previous one, until reaching the end of the first line of blocks, and then moving onto the left-most block in the line of blocks immediately beneath this first line, and completing processing with the block on the bottom right of the image.

Thus, a "current block" (sometimes called "original block"), i.e. an encoding block being processed in the current image, is considered. Processing the current block may comprise partitioning the block into sub-blocks, so as to process the block with finer spatial granularity than the one obtained with the block. Processing a block further comprises predicting the block pixels, by using spatial (in the same image) or temporal (in one or several other previously coded images) correlation between the pixels. When several prediction types, such as for example an Intra prediction, an Inter prediction, a Merge prediction, and/or a Skip prediction are developed in the encoder, predicting the block pixels typically comprises selecting a block prediction type and prediction information corresponding to the selected type, the set forming an encoding parameter set.

Predicting the block of processed pixels allows calculating a pixel residual, corresponding to the interval between the pixels from the current block and the pixels from the prediction block, and is transmitted, in some cases, to the decoder after transform and quantization.

To code a current block, several coding modes are thus possible and it is required to include, in the data generated by the encoding, the coding information 106-108 indicating the choice in the mode of coding which has been performed during the encoding and according to which the data has been encoded. This coding information 106-108 may comprise, in particular, the coding mode (for example the particular type of predictive coding among "Intra" and "Inter" coding, or among "Intra", "Inter", "Merge", and "Skip" coding described hereafter), partitioning (in the case of one or several blocks partitioned into sub-blocks), as well as motion information 106 in the case of "Inter", "Merge", or "Skip" predictive coding and an Intra prediction mode 107 in the case of "Intra" predictive coding. For "Inter", "Skip", and "Merge" coding modes, this information may also be predicted in order to reduce their cost of coding, for example by using the information from the blocks adjacent to the current block.

The HEVC standard uses a quadtree coding structure, described hereafter, combined with a dynamic selection of principal block size. HEVC allows partitioning each current image into blocks with sizes ranging from 64×64 pixels to 8×8 pixels. The video stream to encode may thus be covered with 64×64 blocks, each 64×64 block being able to be cut into smaller blocks (the finest cut authorized being 8×8 blocks, each of 8×8 pixels). The encoder typically chooses a size for the blocks used according to owner criterions which are not defined by the standard.

The HEVC standard also uses an YCbCr representation of the color space of the video signals with 4:2:2 or 4:2:0 sampling (color sub-sampling). The video signal to be encoded carries luminance information (Y signal) and two pieces of chrominance information (Cb and Cr signals). The samples of each component (Y, Cb, Cr) may be coded on 8 bytes, 10 bytes, or more.

In 4:2:2 sampling, an L×L pixel (or sample) luminance zone has a size of L/2×L for each chrominance component, which is equivalent to performing a subsampling of colors only horizontally. The 4:2:2 representation corresponds to the so-called SDI (System Deployment Image) signal format.

In 4:2:2 sampling, an L×L pixel (or sample) luminance zone has a size of L/2×L/2 for each component of chrominance, which is equivalent to performing a subsampling of colors horizontally and vertically.

Each image of a W×H pixel video stream to be encoded (for example, in 1920×1080 pixel HD format and in 3840×2160 pixel 4K format) may be partitioned into coding tree units (CTU) each CTU comprising luminance CTBs (coding tree blocks) of and a corresponding number of chrominance CTBs as well as syntax information. A luminance CTB corresponds to a rectangular L×L sample luminance zone of the image, whereas a corresponding chrominance CTB, when using 4:2:0 chrominance subsampling, covers a set of L/2×L/2 chrominance samples, for each component of chrominance. Unlike the macroblocks with fixed size (16×16 luminance samples) specified by the previous video coding standards of the ITU-T and the ISO, the L×L size of a luminance CTB may vary between 16×16, 32×32, or 64×64 luminance samples.

The luminance CTBs and chrominance CTBs may further be partitioned into a plurality of coding blocks (CBs) using a representation of the partitioning in tree structure. The start CTB representing the root of the tree structure, each tree node may be divided into smaller sized blocks according to an iterative process ending when the minimum size of the component (luminance or chrominance) is reached or at a higher level of the tree structure. The end of each branch of the tree structure, corresponding to a leaf, is called "prediction unit" (PU). Each tree node, apart from leaves, is called "coding unit" (CU). Iterative partitioning of the start CTB, which may correspond to a large coding unit (LCU) of size 64×64, leads to a set of production units, with respective size variations depending on the corresponding level in the tree structure.

Figure 4A:
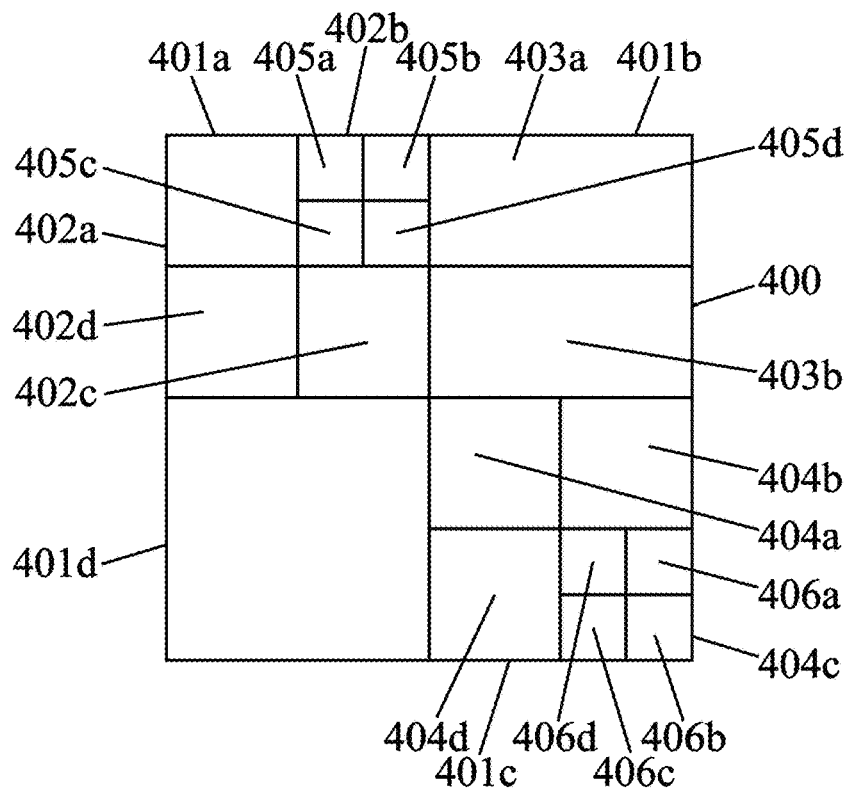
FIGS. 4a and 4b are schematic views illustrating a structure of block partitioning and a corresponding tree structure.
Figure 4B:
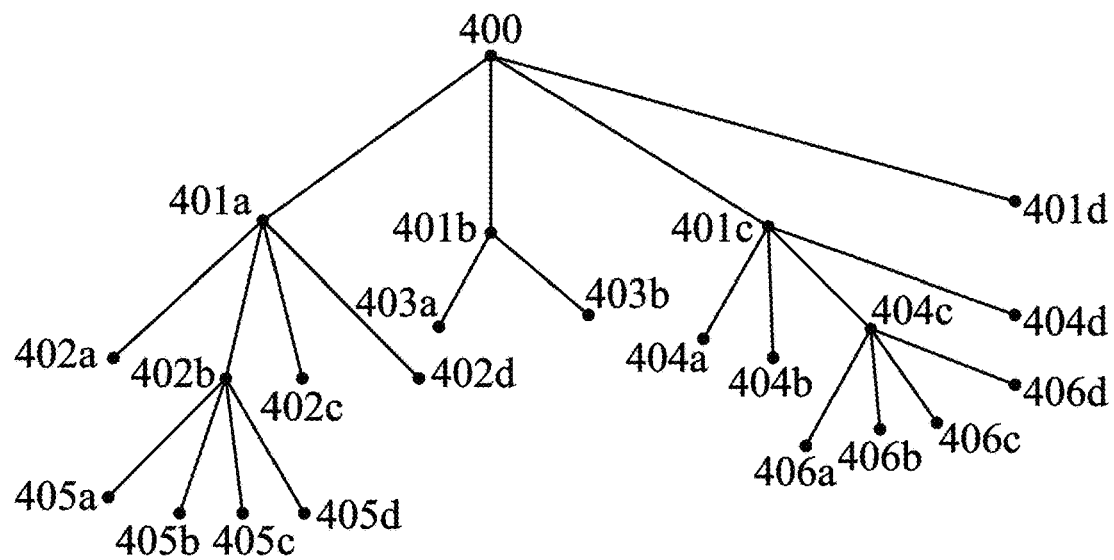

FIG. 4a illustrates an example of 64×64 CTU (400) partitioning, and FIG. 4b illustrates an example of the tree structure representing this partitioning. In FIG. 4a, the CTU (400) is divided into four 32×32 blocks 401a, 401b, 401c, and 401d. The upper left block 401a is divided into four 16×16 blocks 402a, 402b, 402c, and 402d. The upper right block 401b is divided into two 32×16 blocks 403a and 403b. The lower right block 401c is divided into four 16×16 blocks 404a, 404b, 404c, and 404d. The lower left block 401d is not divided. The 16×16 upper right block 402b of the 32×32 upper left block 401a is divided into four 8×8 blocks 405a, 405b, 405c, 405d. The 16×16 lower right block 404c of the 32×32 lower right block 401c is divided into four 8×8 blocks 406a, 406b, 406c, 406d.

The pieces of syntax information describing this example of partitioning may for example specify, for each tree node, whether the corresponding block is divided, and if so, indicate the number of lower level nodes. When a single division type (e.g. four blocks of half the size) is used, the division information for each node may only indicate whether the corresponding block is divided.

Each production units determined by partitioning the CTBs may then be coded, using an Inter, Intra, Skip, or Merge prediction.

Examples of the "Intra", "Inter, "Merge, and "Skip" prediction modes are described hereafter, in order to facilitate the understanding of the implementation of the method proposed for video coding using these prediction modes.

As indicated above, the "Intra" mode predictive coding includes predicting pixels from a block (or a set) of pixels being processed using the previously coded pixels from the current image. There are different "Intra" predictive coding modes, including some which are described hereafter:

In the "Intra" prediction mode, so-called DC (Discrete Continuous), values from the pixels adjacent to the current block belonging to blocks which have previously been coded are used, and an average of the values for these adjacent pixels is calculated. The predictive block is constructed using for each pixel the average value obtained.

Figures 2A, 2B:
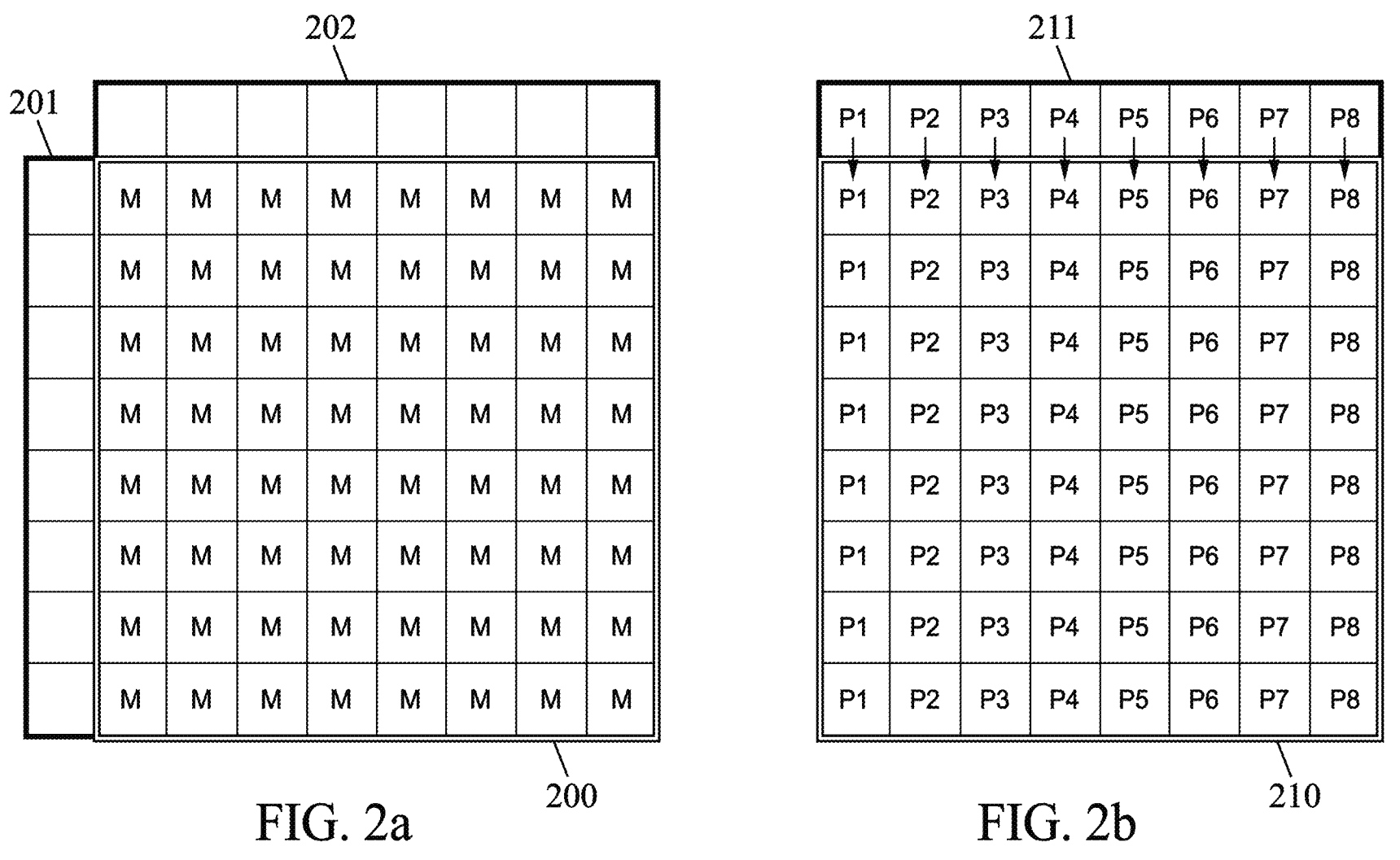

For example, if an 8×8 pixel block 200 is considered, such as the one illustrated in FIG. 2a, the two adjacent sets of 8 pixels 201, 202 of the adjacent block located on the left of the current block and the adjacent block located above the current block are used. An average value M of these 16 pixels is calculated and used to fill in the pixel values of the predictive block 200.

In the "Intra" prediction mode, so-called "V" ("Vertical"), adjacent pixel values are used from the current block belonging to the adjacent block located above the current block, when these adjacent pixels have previously been coded, and the value of each adjacent pixel is reproduced for the pixels of the corresponding column in the predictive block.

For example, considering an 8×8 pixel block 210 such as the one illustrated in FIG. 2b, the set of 8 adjacent pixels 211 from the adjacent block located on the left or on the right of the current block may for example be used, in the case where the coding coverage of blocks is such that this block has already been coded. The value for each of the 8 adjacent pixels is reproduced in the corresponding column of the predictive block 210.

In the "Intra" prediction mode, so-called "H" ("Horizontal"), values from the pixels adjacent to the current block belonging to the adjacent block located on the left or on the right of the current block are used, when these adjacent pixels have previously been coded, and the value of each adjacent pixel is reproduced for the pixels of the corresponding line in the predictive block.

In the "Intra" prediction mode, so-called "VL" ("Vertical-Left"), the values of the pixels adjacent to the current block belonging to the adjacent block located immediately above and below on the right of the current block are used, when these adjacent pixels have previously been coded, and the value of each adjacent pixel is reproduced for the pixels of the corresponding column in the predictive block.

Figure 2C:
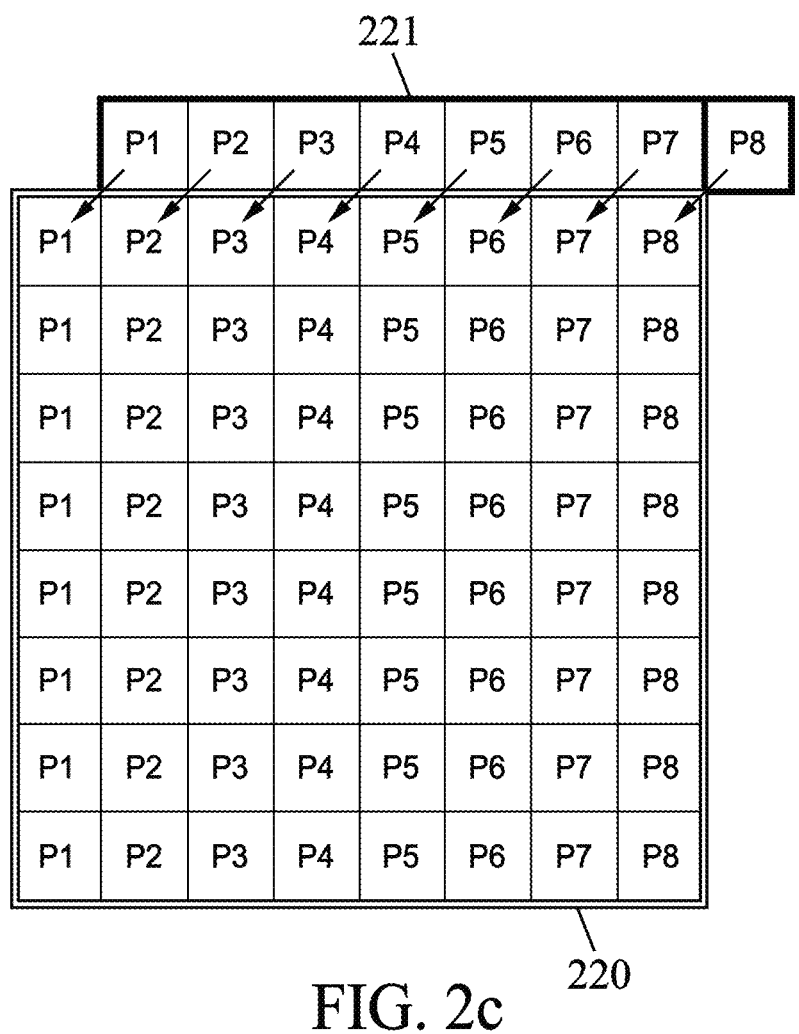

For example, considering an 8×8 pixel block 220 such as the one illustrated in FIG. 2c, the set of 8 adjacent pixels 221 of the two adjacent blocks located immediately above and below, respectively, on the right of the current block may be used, in cases where the coding route of the blocks is such that the adjacent blocks, or at least the considered adjacent pixels, have already been coded. The value of each of the 8 adjacent pixels is reproduced in the corresponding column of the predictive block 220 according to a direction of diagonal leftward projection such as illustrated in FIG. 2c.

The H.264/AVC standard discloses 9 Intra prediction modes (including DC, H, V, VL prediction modes described above). The HEVC video coding standard on the other hand discloses 35 Intra prediction modes for the luminance samples, and 5 modes for the chrominance samples.

These video coding standards also disclose particular cases for performing an Intra prediction. For example, the H.264/AVC standard authorizes cutting 16×16 pixel blocks into smaller blocks, of up to 4×4 pixels, so as to increase the granularity of processing for predictive coding.

As indicated above, the Intra prediction mode information is predicted so as to reduce the cost of coding. Indeed, the higher the number of usable prediction modes, the higher the cost of transmitting an index identifying the Intra prediction mode in the encoded stream. Even in cases of H.264/AVC coding, transmission of an index between 1 and 9 identifying the Intra prediction mode used for each block of the 9 possible modes is expensive in terms of cost of coding.

Thus, a most probable mode, MPM, used for coding on a minimum amount of bytes the Intra prediction mode which is the most probable is calculated. The MPM is the result of the prediction of the Intra prediction mode used for coding the current block.

When the Intra mode is selected for encoding the current block, the pixel residual and the MPM may typically be transmitted to the decoder.

Predictive coding of prediction by temporal correlation referred to, in some video coders, as "Inter" includes predicting the pixels from the block (or set) of pixels being processed using pixels from one or several previously coded images (pixels which are therefore not from the current image, unlike the Intra prediction mode).

The Inter prediction mode typically uses one or two sets of pixels located in one or two previously coded images, respectively, in order to predict the pixels of the current block. However, for an Inter prediction mode, using more than two sets of pixels located in more than two separate previously coded images, respectively, may be considered. This technique, called motion compensation, implies determining one or two vectors, called motion vectors, indicating the position of the set or the sets of pixels to use respectively for the prediction in the previously coded image or images (sometimes called "reference image"). With reference to FIG. 1, the vectors used for the "Inter" mode must be chosen by the encoder 100 via the motion estimation unit 110 and the Inter/Merge/Skip mode prediction units 104. Implementing motion estimation within the encoder 100 may thus provide, depending on cases, determining a single motion estimation vector or two motion estimation vectors pointing towards potentially different images.

The motion estimation vector or vectors output from the motion estimation unit 110 is provided at the Inter/Merge/Skip mode prediction unit 104 for generating the Inter prediction vectors. Each Inter prediction vector may indeed be generated from a corresponding motion estimation vector.

The motion estimation for a current block is described in further detail hereafter according to the embodiments.

Motion estimation may consist in studying block movement between two images by using the temporal correlation between pixels. For a given block in the current image (current block or origin block), motion estimation allows selecting a most similar block (named "reference block") in a previously coded image, so-called "reference image", by representing the motion of this block e.g. with a two-dimensional vector (therefore having two components representing for example a horizontal movement and a vertical movement, respectively).

The motion estimation method is non-normative and is therefore likely to differ from one encoder to the other.

For example, the motion estimation method may comprise searching in a zone of variable size from the reference image, for example defined from the reference image block corresponding to the origin block in the origin image, in order to test the similarity of the origin block with variable numbers of candidate blocks in the reference image.

The correlation between the block and its movement according to a movement estimation vector may be calculated using the Sum of Absolute Differences (SAD):

$$SAD = \Sigma_x \Sigma_y |p_{xy} - p'_{xy}| \quad (1)$$

where $p_{xy}$ is the pixel in position (x, y) of the origin block and $p'_{xy}$ is the pixel in position (x, y) of the reference block. A low SAD is interpreted as an indication that the two blocks are very similar.

The vector resulting from the motion estimation, corresponding to the closest reference image block with respect to the origin block among the candidate blocks tested in the reference image, may be used as a basis for determining an Inter prediction vector. Indeed, according to the developments, the Inter prediction method may include optimizations aiming to select a separate vector from the vector resulting from the motion estimation, so as to have the prediction with the lowest possible cost for the tested mode.

This optimization may for example comprise testing one or several vectors around the vector resulting from the motion estimation likely to give a better result depending on the objective followed. As a consequence, the vector used for Inter prediction with regard to a given reference image is not necessarily identical to the vector resulting from the motion estimation for this reference image.

When the Inter mode is selected for encoding the current block, the pixel residual (calculated for each Inter prediction vector depending on the pixels of the current block and the pixels of the block pointed by the Inter prediction vector considered) and information related to the corresponding Inter prediction vector or vectors.

However, the Inter prediction vector or vectors may represent a high cost in the video encoders. Some encoders reduce these costs of coding by using the vectors of the block adjacent to the block being encoded. This optimization involves predicting the Inter prediction vector or vectors, in the same way as predicting the Inter prediction mode in the case of Intra mode predictive coding of the block.

As indicated above, the information related to each Inter prediction vector may thus be reduced in size by transmitting, instead of the vector coordinates for example, a predictor vector index in the dictionary known to the encoder and the decoder, and a residual quantifying the distance between the prediction vector and the predictor vector.

For example, in H.264/AVC coders, a median predictor vector $mv_{pred}$ is used for predicting the vector mv to be coded:

$$\varepsilon_{mv} = mv - mv_{pred} \quad (2)$$

Only the residual $\varepsilon_{mv}$ is transmitted in the encoded stream, so as to significantly reduce the costs of coding.

The principle used in the HEVC standard is similar in that it provides for the transmission of a vector residual $\varepsilon_{mv}$, which is however not calculated using the median predicted vector. The accurate norm makes it a method for calculating a set of predicted vectors. The encoder then chooses the predictor among these possible predicted vectors. It can therefore transmit, with the vector residual, an index number for the selected predictor vector, such that the decoder may use the same one.

Figure 3:
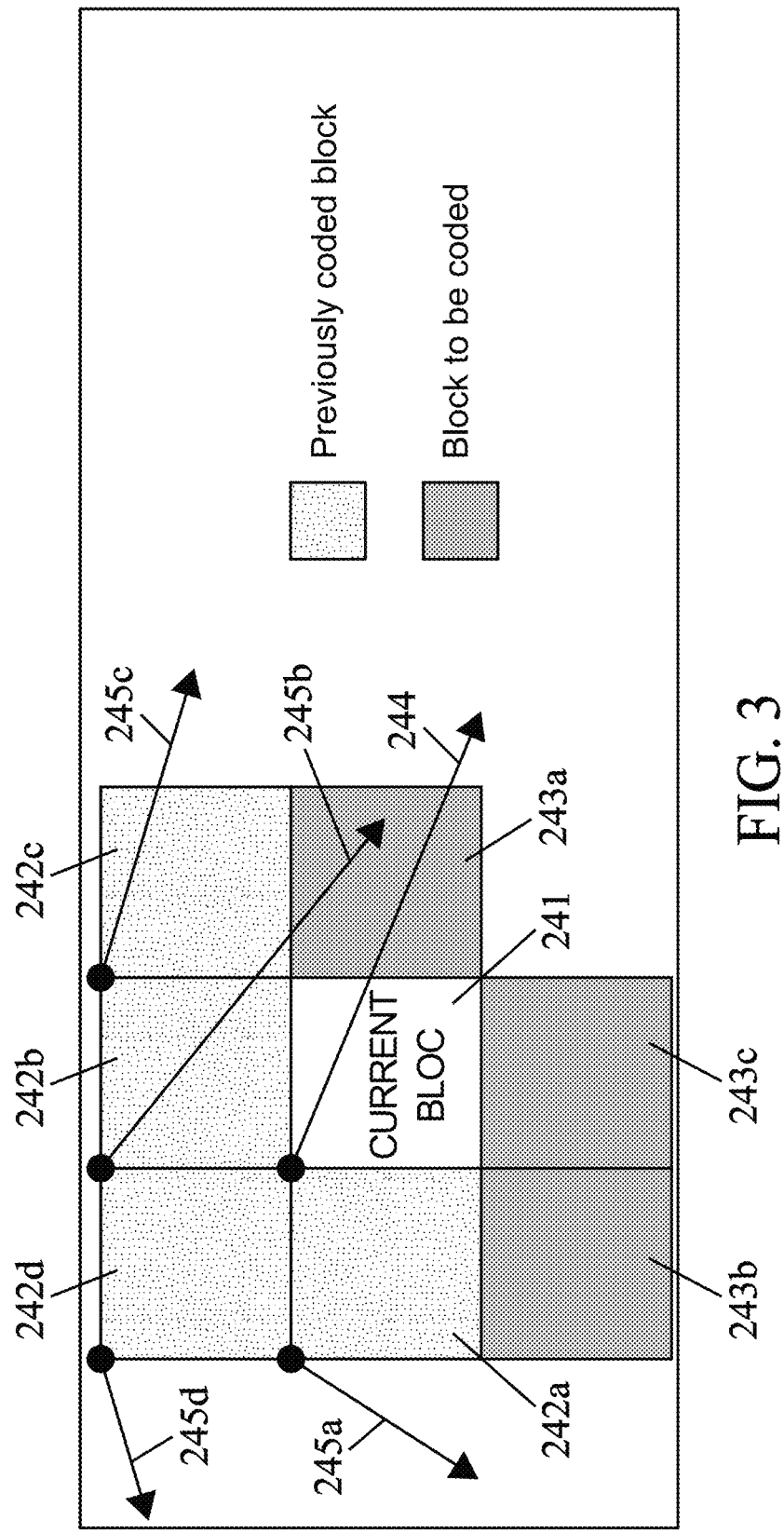
FIG. 3 is a schematic view illustrating the determination of a median vector for coding in the Inter prediction mode.

FIG. 3 illustrates the determination of a predictor vector corresponding, in the illustrated example, to the median between the vectors of previously coded adjacent blocks. With reference to FIG. 3, the current block (being encoded) 241 is surrounded by four previously coded adjacent blocks 242a, 242b, 242c, 242d and three adjacent blocks 243a, 243b, 243c which are still to be coded.

The example shown assumes an encoding route for blocks of the image such that, for each block being encoded, the blocks located on the left or above the current block have already been encoded, such that, in FIG. 3, the previously encoded adjacent blocks 242a, 242b, 242c, 242d are located on the left 242a or on top 242b, 242c, 242d of the current block 241. The predictor vector $mv_{pred}$ 244 of the current block 241 corresponds to the median between respective vectors 245a, 245b, 245c, 245d of the previously coded blocks 242a, 242b, 242c, or 242d, or 242a, 242b, 242d when for example 242c is unavailable (e.g. in cases where the block 242c is encoded according to Intra mode predictive coding). A bad predictor vector results in an extra cost of coding for the current block 241. In another particular case where only one or two adjacent blocks are coded in Inter mode, the H.264/AVC and HEVC standards provide rules allowing using one of the available vectors as long as the median is not calculable.

Some coders use, sometimes in the "Inter" prediction mode, a mode referred to in some video encoders as "Skip" in which, like in the case of Inter mode, the current block is predicted using pixels from previously coded images (one or two images, or even more depending on the development), The Skip mode is also sometimes presented as a sub-mode of the Inter mode, because it corresponds to an "Inter" prediction mode without transmission (or generation in the encoded stream) of prediction vector or pixel residual.

The Skip method is applicable when the pixel residual is low enough for the transmission of the encoder output stream to be considered unnecessary.

On the other hand, with a view to minimizing the cost of coding, the prediction vector or vectors used for this mode are typically not transmitted to the decoder, and are deducted by the decoder from a predetermined list of possible vectors (referred to, like for the "Inter" mode, as "predictor vectors"), which allows for example transmitting only the position of the predictor vector (e.g. a position index in the list of predictor vectors) instead of transmitting its value (e.g. coordinates). Thus, for example, in this coding mode, a predictor vector is directly selected from a predetermined list known to the decoder, the predictor vector selection being performed from blocks adjacent to the current block that have previously been coded. As mentioned above, in cases where the Skip and Inter modes implemented in the encoder both use a list of predictor vectors, the respective lists of predictor vectors, either due to their size or to their respective contents, are not necessarily identical.

The HEVC standard provides another predictive coding mode, so-called "Merge", similar to the Skip mode described above with the difference that a pixel residual may be transmitted. Thus, the Merge mode may also match an Inter prediction mode, without transmission (or generation in the encoded stream) of a prediction vector, but in which a pixel residual is generated and transmitted in the encoded stream.

Redimensioning (also called resampling) is a technique that allows, from a video stream composed of W×H pixel images, changing the image size of the stream to be redimensioned according to a scale factor for generating a sequence of images reduced in size corresponding to the original video stream. The size of each image of the video stream is thus modified (e.g. reduced) by a scale factor in order to create the images of the redimensioned video sequence.

For example, a redimensioning technique may be used to change from a 4K video stream (i.e. 4 HD, with 3840×2160 pixel images), to a 1 HD video stream (i.e. HD, with 1920×1080 pixel images).

Redimensioning is a technique which can be used in video processing to accelerate processing time and improve performances of the algorithms. It is for example used for estimating hierarchical motion, where a multiple successive redimensioning of source images may be performed. Iterative motion estimates are then carried out in each sub-resolution by using the results (motion vectors) of the lower resolution at each step. This results in a motion field corresponding to the real movement and determined quickly compared to other available motion estimation algorithms. This principle is also found in so-called scalable schemes for encoding videos such as CCS (Common Channel Signaling) when using scalability in resolution. Thus, quick decision solutions using decisions between the different layers were studied under CCS. Reference is made, for a detailed description of these solutions, to the article by H. Li et al., entitled «Fast Mode Decision for Spatial Scalable Video Coding», in IEEE International Symposium on Circuits and Systems, Island of Kos, Greece, May 2006.

Regarding the so-called conventional encoding schemes, applying such technique to the coding choices (partitioning, prediction modes, transform selection . . . ) still remains difficult with standards preceding the HEVC standard (particularly MPEG-2 and H.264/AVC). Indeed, the coding structure using a fixed 16×16 pixel macro-block does not allow to easily apply a decision of sub-resolution to the original resolution sequence.

However, the inventors of this invention have discovered that this is made possible with HEVC and its quadtree coding structure combined with the dynamic selection of the main block size.

The proposed method uses this possibility to significantly accelerate the encoding process by directly applying a decision made on a video redimensioned to the original video, by transposition of encoding parameters generated from the redimensioned video.

Figure 5:
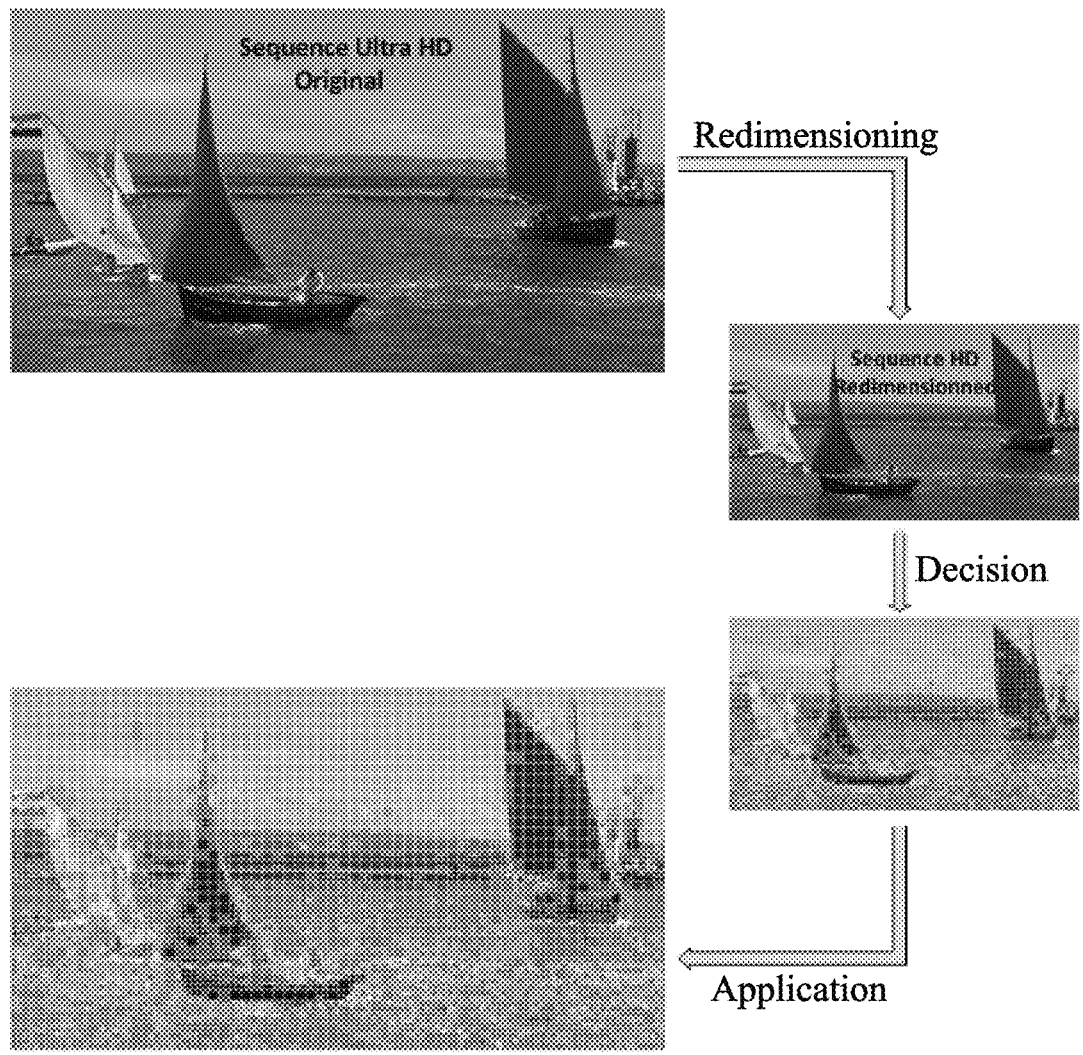
FIG. 5 is a schematic view illustrating a particular mode for implementing the method proposed.

With reference to FIG. 5, the proposed method comprises redimensioning the original sequence by a predetermined factor (e.g. equal to two, to change from an Ultra HD video to an HD video). The choice of coding is then carried out on the redimensioned sequence before applying them to the sequence of original size.

In one or more embodiments, the last two steps can be carried out at the coding unit level so as to maintain cohesion between the choices made and to easily fit into the architecture of the available encoder, in order to maximize performances. Specifically, each coding unit is thus decided in its redimensioned version and this decision is then immediately converted for the original size coding unit. This conversion requires, in particular, transposing the block and transform sizes as well as changing the motion vectors to the right scale. The remaining steps on the original image may, in one or more embodiments, comprise reconstructing, writing according to a coding protocol such as the CABAC ("Context-based Adaptive Binary Arithmetic Coding") protocol and/or optionally processing by filtering. This allows saving a lot of processing specific to the decision (Intra and Inter prediction, transform choice, vector refining . . . ) made in the redimensioned version and which are not on the original (non-redimensioned) version. The compression performances are maintained due to the consistency between the images in both resolutions. Compared to a conventional decision, an average error of less than 8% was observed among the main choices. This rate is even lower on bidirectional images.

Figure 6:
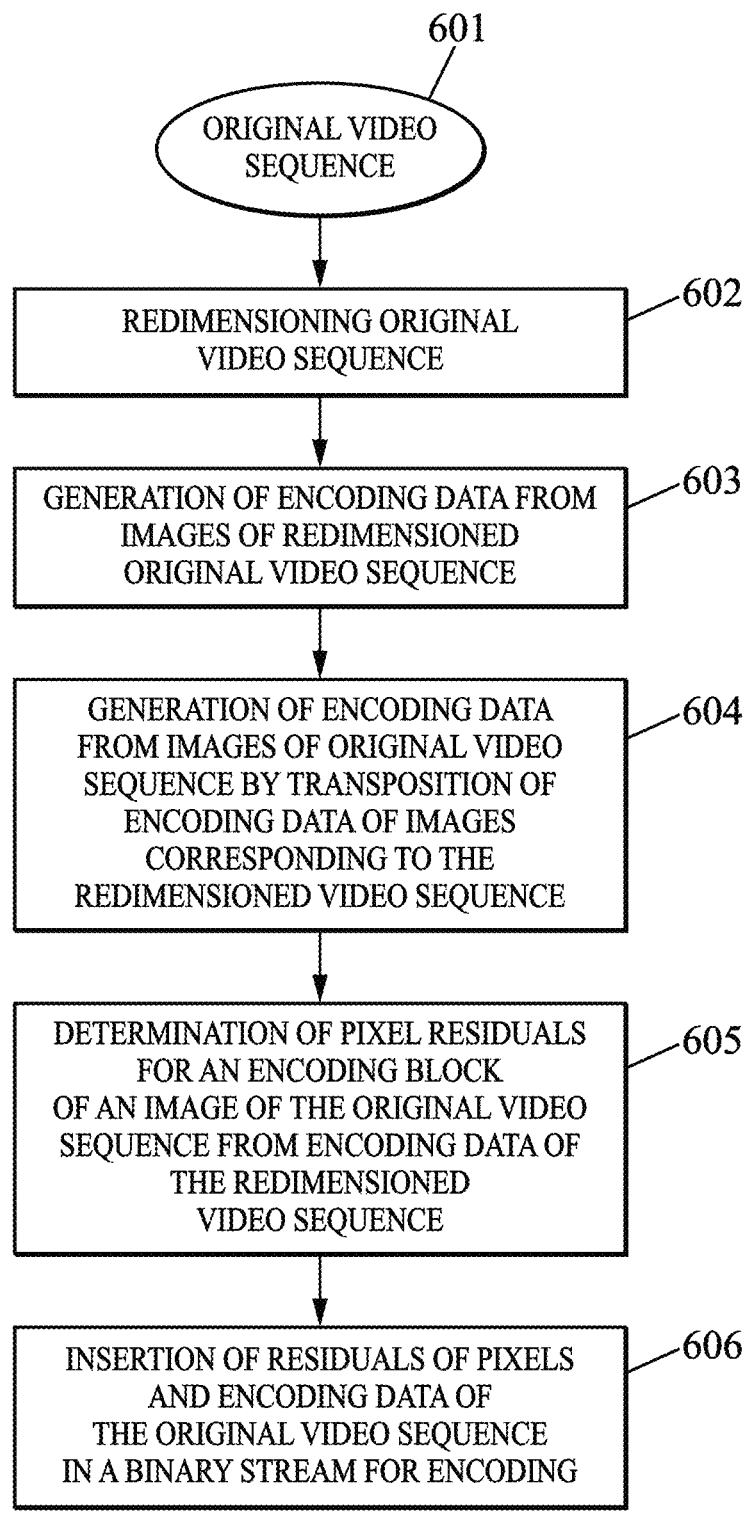
FIGS. 6, 7a, and 7b are schematic views illustrating the method proposed according to different particular modes of implementation.

FIG. 6 is a diagram illustrating the method proposed according to an embodiment.

The case of a video sequence (601), so-called original video sequence, is considered, comprising a first set of images.

The image size of this first set of images is reduced (602) according to a scale factor to generate a second set of images. In one or more embodiments, this size reduction can be performed using known video redimensioning techniques which comprise filtering and sub-sampling the original video sequence. The redimensioning technique can for example use a so-called Lanczos resampling algorithm, bilinear resampling, or any other resampling technique known.

For each image of the first set of images, the encoding data is generated (603) from the corresponding image in the second set of images. Encoding data is thus generated from the images of the redimensioned video sequence. This encoding data may contain partitioning data defining a partitioning of the encoded image of the redimensioned video sequence into encoding blocks as well as predictive coding data of the encoding blocks resulting from the partitioning.

Encoding data of images from the original video are generated (604) by transposing encoding data of the corresponding images from the redimensioned video sequence. Partitioning data for the images of the original video sequence and the predictive coding data of the encoding blocks resulting from the data partitioning may in particular be generated by respective scale transposition, depending on the scale factor, of the corresponding data generated from the redimensioned video sequence.

Once the partitioning of images from the original video sequence has been determined, and the encoding blocks of each image from the original video sequence have therefore been identified, pixel residuals representing a distance between, on the one hand, the pixels from the encoding block, and on the other hand the pixels from a prediction block of the encoding block, are determined (605) for at least one encoding block, this prediction block being previously determined from the predictive encoding data obtained for the encoding block by scale transposition of the corresponding predictive encoding data in the redimensioned video sequence. As explained above, in one or more embodiments, the pixel residuals is not necessarily calculated for all the encoding blocks, and in particular for the encoding blocks for which the Skip mode is applied.

In one or more embodiments, the pixel residuals generated in this way may be transformed by applying a block transformation (not represented in FIG. 6), for example of a Discrete Cosine Transform, DCT. The data generated by this transformation may also be quantified prior to being inserted in the encoding stream.

When encoding a block of the redimensioned video involves transforming blocks of pixel residuals determined for the block, this block transformation may also be applied to pixel residuals determined for the corresponding block in the original video. In one or more embodiments, at least some of the parameters of the block transformation applied to the pixel residuals determined at the original level (i.e. for the block in the original video sequence) is determined by scale transposition, depending on the scale factor used for the redimensioning operation, of parameters for the block transformation applied to the pixel residuals determined at the hierarchical level (i.e. for the current block in the redimensioned video).

The pixel residuals, optionally transformed and/or quantified, are inserted (606), with the data of the encoding images from the original video in a binary stream for encoding the original video sequence.

The proposed method allows generating encoding data for the original video sequence by direct transposition of encoding data from the redimensioned video sequence. The proposed method significantly accelerates the encoding process for the original video sequence as it does not systematically implement the set of encoding algorithms on the original video, even though there are acceleration techniques for these algorithms using the results generated from the redimensioned video sequence, but directly transposes some encoding data generated for the redimensioned video sequence to obtain encoding data for the original video sequence.

Some encoding data of the original video sequence, including data for the partitioning into encoding blocks and data the predictive coding of encoding blocks, are obtained by respective scale transposition, depending on the scale factor used for generating the redimensioned video sequence. When the predictive encoding of an encoding block from an image of the original video sequence provides for the generation and transmission of pixel residuals, these pixel residuals are determined on the basis of the pixels from the encoding block and the pixels from a prediction block of the encoding block, this prediction block being determined from the predictive coding data for the encoding block (obtained by scale transposition of encoding data generated for the redimensioned video sequence).

Figure 7A:
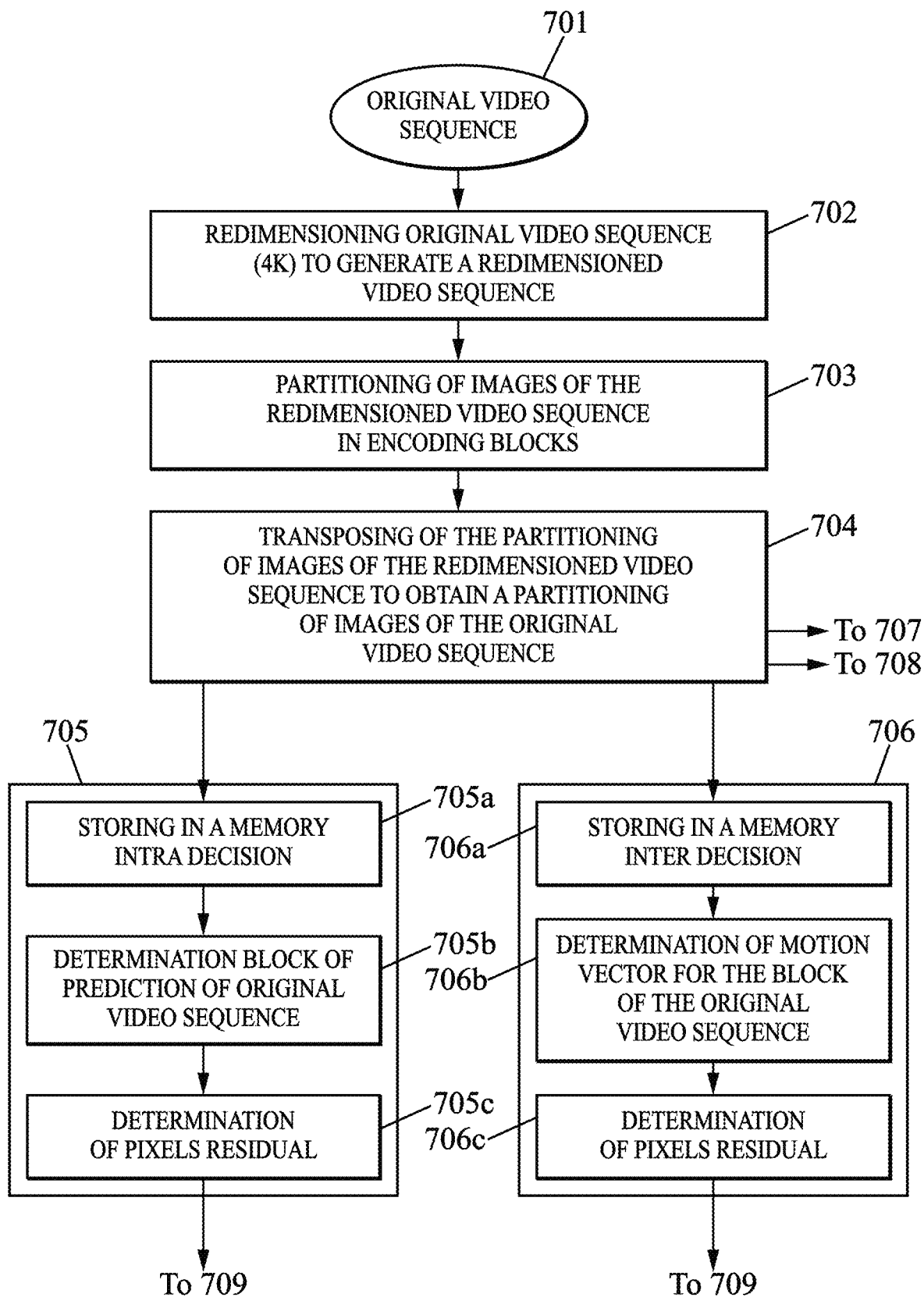
Figure 7B:
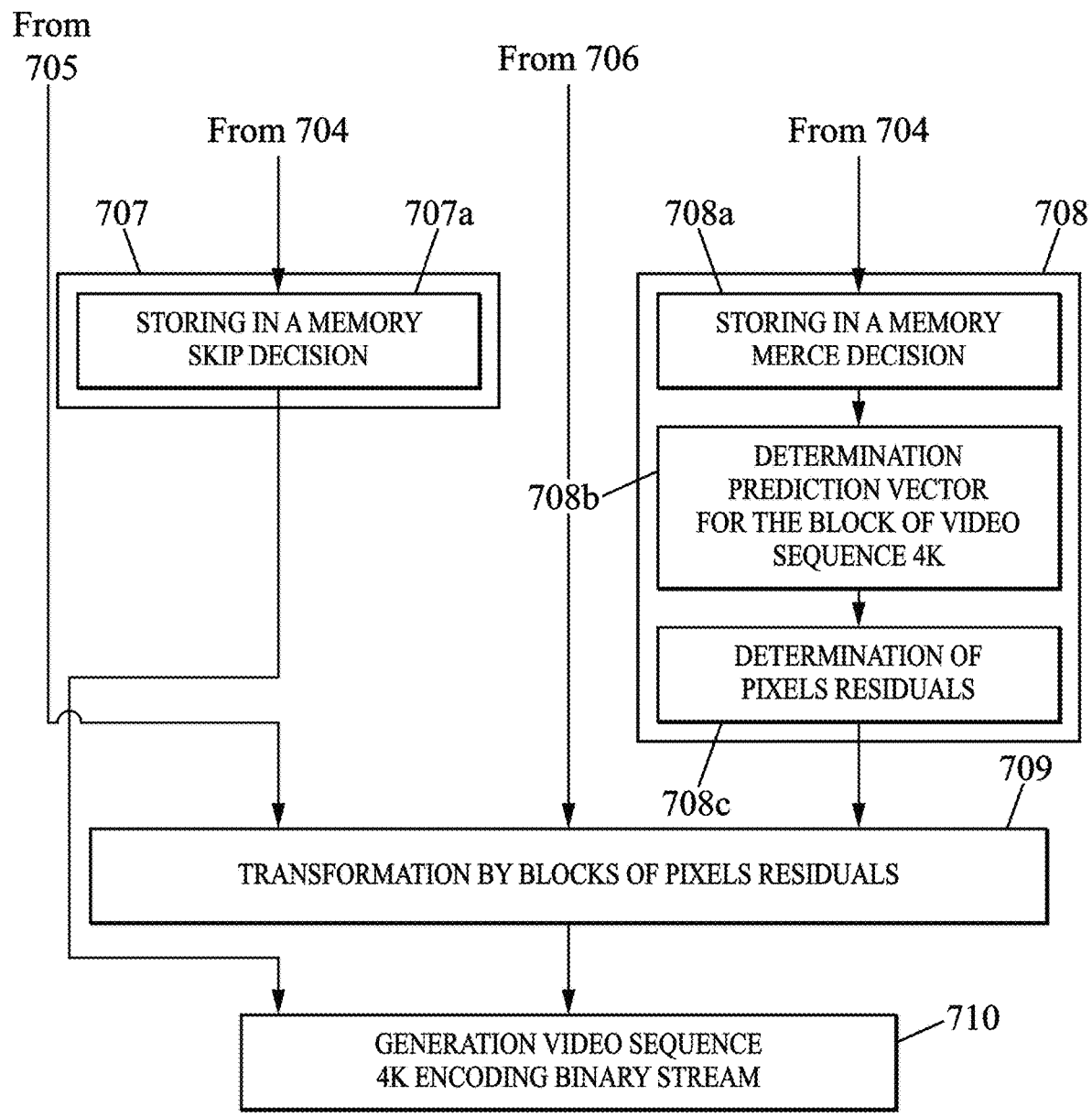

FIGS. 7a and 7b illustrate the transposition of predictive coding data generated on an original video sequence to obtain predictive coding data on an original sequence (701), for example in 4K format, redimensioned to a 1 HD video sequence. Of course, this example of transposition is not limiting and is particularly not limited to the case of a 4K sequence redimensioned to a 1 HD video sequence.

The original 4K video is redimensioned to generate (702) an HD video.

The original video sequence is then covered to determine (703), for each image of the sequence, a partitioning into encoding blocks. In the particular case of HEVC encoding, partitioning an image of the video sequence is performed according to an iteration sequence to produce a level partitioning which may be represented by a tree structure as described above.

An encoding block defined for an image of the original video sequence by the partitioning operation may be transposed on the corresponding image of the original video sequence by multiplying the dimensions of the block by a scale factor, being two in the case of a transposition from 1 HD to 4K. Thus, 32×32, 16×16 or 8×8 encoding blocks determined by partitioning an image of the HD video sequence correspond to 64×64, 32×32 and 16×16 encoding block, respectively, defining the partitioning of the corresponding image in the 4K video sequence.

In the case of HEVC encoding, the tree structure obtained by the quadtree partitioning of each image in the original video sequence is saved to define the partitioning of the respectively corresponding images from the redimensioned video, subject to transposing the size of each element of the tree structure by multiplying it by a scale factor corresponding to the redimensioning scale factor.

The proposed method thus does not provide executing the partitioning algorithm chosen on the original video sequence again, after having executed it on the redimensioned video, but for transposing (704) the results of the partitioning algorithm executed on the redimensioned video sequence to define a partitioning of the original video sequence.

The encoding blocks defined by the partitioning of the original video is encoded in one or more predictive coding modes, e.g. of temporal correlation prediction type using a plurality of images from the original video sequence, or of spatial correlation prediction type. In one or more embodiments, the predictive encoding of an encoding block includes a coding decision, according to one or more predictive coding modes, such as, for example, Infra, Inter, Skip and/or Merge coding modes as described above.

In one or more embodiments, the predictive coding decision for an encoding block of an image from the original video sequence may be used for the corresponding encoding block determined by transposition for the redimensioned video sequence. Depending on the development, the decision for an encoding block of an image from the redimensioned video sequence could for example be memorized in order to be applied for encoding a corresponding encoding block in an image of the original video sequence.

This principle of reusing a predictive coding decision made for an encoding block of the redimensioned video sequence for an encoding block of the original video sequence may be applied to all the predictive coding modes available with the encoder used for encoding the redimensioned video sequence, such as the Intra, Inter, Merge, and/or Skip modes described above.

In one or more embodiments, when the predictive coding decision taken for an encoding block of an image of the original video sequence determines (705) a type of predictive coding by spatial correlation, such as Intra coding described above, this decision is used (705a) for the corresponding encoding block determined by transposition for the redimensioned video sequence. Depending on the development, the decision of Intra coding for the encoding block of the redimensioned video sequence is memorized to be used for the corresponding encoding block from the original video sequence. The prediction block of the encoding block in the image of the redimensioned video sequence is determined (705b) by scale transposition of the prediction block in the corresponding image of the original video sequence determined for the encoding block of this corresponding image.

A pixel residual for the Infra coding of the encoding block in the redimensioned video sequence may be calculated (705c) by determining a distance, for example according to the methods described above, between the pixels of the encoding block (of the redimensioned video sequence) and the pixels of the prediction block in the image of the redimensioned video sequence.

Thus, in the case of decision of Intra type made for an encoding block of the original video sequence, the proposed method does not execute the encoding algorithm for the encoding block in the redimensioned video sequence again. The proposed method makes the decision of Intra type again for the encoding block of the redimensioned video sequence, and identifies blocks in the image of the redimensioned video sequence corresponding to the encoding block of the original video sequence, on the one hand, and to the encoding block prediction block from the original video sequence, on the other hand, by scale transposition applied respectively to each of these blocks.

In one or more embodiments, when the decision of predictive coding an encoding block of an image in the original video sequence determines (706) a prediction coding by temporal correlation using a plurality of images from the original video sequence, such as Inter coding described above, this decision is made (706a) for the corresponding encoding block determined by transposition for the redimensioned video sequence. Depending on the development, the decision of Inter coding for the encoding block of the redimensioned video is memorized to be used for the encoding block corresponding to the original video sequence. The motion vector of the encoding block in the image of the original video sequence is not determined by the motion estimation unit (110) (in FIG. 1) by executing the motion estimation algorithm on the block from the original video sequence again, but is determined (706b) by scale transposition of the motion vector in the encoding block of the corresponding image from the redimensioned video sequence (which has been determined by the motion estimation unit (110) (in FIG. 1) during the encoding of the redimensioned video sequence), for example by multiplying the components of the vector by a scale factor, which may be two in the case of a transposition from HD to 4K. This multiplication corresponds to a ratio homothety corresponding to the scale factor and the origin center of the motion vector.

A pixel residual for Inter coding the encoding block of the redimensioned video sequence may be calculated (705c) for each Inter prediction vector determined from a transposed motion vector to be applicable to the original video sequence depending on the pixels of the current encoding block from the original video sequence and the pixels of the block pointed by the Inter prediction vector considered. The block pointed by the Inter prediction vector is then used as the prediction block of the encoding block determined from the predictive coding data being the decision of Inter coding and obtaining the prediction vector by scale transposition of the determined motion vector for the redimensioned video sequence.

Depending on the development of the Inter prediction in the encoder, an index for a predictor vector may also be determined in a dictionary known to the encoder and the decoder, as well as a residual quantifying the distance between the prediction vector and the predictor vector.

In one or more embodiments, when the decision of predictive coding an encoding block of an image from the original video sequence determines (707) a prediction coding by temporal correlation using a plurality of images from the original video sequence directed to apply on the encoding block a Skip mode described above, this decision is made (707a) for the corresponding encoding block determined by transposition for the redimensioned video sequence. Depending on the development, the decision of Skip coding the encoding block from the redimensioned video sequence is memorized to be used for the encoding block corresponding to the original video sequence. Determining pixel residuals or vector residuals not being provided for the Skip mode in one or more embodiments, it is not necessary to determine the pixel residuals or vector residuals in this case, either at the original level (original video sequence) or at the hierarchical level (redimensioned video sequence).

In one or more embodiments, when the decision of predictive coding an encoding block of an image from the original video sequence determines (708) a prediction coding by temporal correlation using a plurality of images from the original video sequence directed to apply on the encoding block a Skip mode described above, this decision is made (708a) for the corresponding encoding block determined by transposition for the redimensioned video sequence. Depending on the development, the decision of Merge coding the encoding block from the redimensioned video sequence is memorized to be used for the encoding block corresponding to the original video sequence. The prediction vector of the encoding block in the image of the redimensioned video sequence is determined (708b) by scale transposition of the prediction vector in the encoding block from the corresponding image of the original video sequence, e.g. by multiplying the coordinates of this prediction vector by a scale factor, which may be two in the case of a transposition from HD to 4K.

A pixel residual for Inter coding the encoding block of the redimensioned video sequence may be calculated (708c) for each Merge prediction vector transposed to be applicable to the original video sequence depending on the pixels of the current encoding block in the original video sequence and the pixels of the block pointed by the Merge prediction vector considered. The block pointed by the Merge prediction vector considered is then used as the prediction block of the encoding block determined from the predictive coding data being deciding on Merge coding and obtaining the prediction vector by scale transposition of the prediction vector determined for the redimensioned video sequence.

Determining vector residuals not being provided for the Merge mode in one or more embodiments, it is not necessary to determine the residual vector in this case, either at the original level (original video sequence) or at the hierarchical level (redimensioned video sequence).

Pixel residuals corresponding to a distance between the pixels of a current encoding block (e.g. "Predicting Unit" in the case of HEVC encoding) and the pixels of a prediction block, they may be considered as forming one identical block of the same size as the current encoding block. As indicated above, in one or more embodiments, a transform unit may be applied (709) to the pixel residuals which are optionally generated, depending on the decision made regarding the predictive coding mode of the current block in the redimensioned video sequence. In the example embodiment illustrated in FIGS. 7a and 7b, Intra, Inter, and Merge coding modes resulting in pixel residual calculations performed at the original level, that is to say on images of the original video sequence, a block transformation is applied (709) to the calculated pixel residuals in each specific case, e.g. of DCT type. The Skip coding mode not requiring the calculation of pixel residuals, the block transformation is typically not applied to the data generated in the case of a Skip decision.

In one or more embodiments, in the case where the algorithm for encoding the redimensioned video sequence applies a block transformation to the pixel residuals determined for an encoding block by previously selecting block transformation parameters for this encoding block, this block transformation is also applied to the pixel residuals determined at the original level, that is to say for the corresponding block in the original video sequence, with the block transformation parameters, some of which being previously determined by scale transformation of block transformation parameters used for the block of the redimensioned video sequence.

For example, the block size selected for block transformation by the algorithm for encoding the redimensioned video sequence may be multiplied by a scale factor corresponding to that used for the redimensioning operation.

In the particular case of redimensioning from 4K to HD, this scale factor may be four, each of the dimensions, e.g. vertical and horizontal, of a transform unit, TU, being doubled.

For example, considering an HEVC coding algorithm selecting a DCT block transformation for pixel residuals determined for an encoding block for a HD redimensioned video sequence with 8×8 transform units, the algorithm for encoding the 4K video sequence corresponding to the redimensioned HD video sequence does not perform size selection for the transform units for the DCT block transformation of pixel residuals determined for the encoding block of the 4K video sequence corresponding to the encoding block of the of HD video sequence, but performs a transposition of the size of the transform units used for the encoding block of the HD video sequence by multiplying by two the dimensions of the transform units, to use 16×16 transform units.

Block transformation may be followed by a quantization, allowing for example to force to zero the lowest values among the result values of block transformation.

A binary stream for encoding the original video sequence may then be generated (710), particularly on the basis of the partitioning data, predictive coding data comprising decisions made for encoding blocks of the images from the original video sequence defined by the partitioning data, and the residual, optionally being block transformed and/or quantified in the case of pixel residuals.

Determining data for encoding the images of the original video sequence by transposition of encoding data generated on the basis of a redimensioned version of the original video sequence may be improved in one or more embodiments, in cases where encoding according to a standard, such as HEVC standard, is desired.

Indeed, some encoding parameters defined by the standard considered may not be used for the original video sequence due to the transposition of encoding data generated not from original video sequence, but from a redimensioned version thereof.

For example, transposition of the HEVC encoding data for a larger scale may lead to limitations in the depth of the quadtree, on the one hand, and in sub-pixel accuracy of the motion vectors on the other hand.

In one or more embodiments, encoding an original video sequence is provided according to a first set of encoding parameters. This first set of encoding parameters may for example correspond to the encoding parameters defined by a standard, such as the HEVC standard.

Regarding the image partitioning operation, the first set of encoding parameters may include a first set of partitioning parameters to perform, like in the HEVC standard, the partitioning of the video sequence to be encoded with block ranging from 64×64 pixels for the largest block, to 8×8 pixels for the smallest block (blocks so horizontal and vertical dimensions which may each be 8, 16, 32, or 64 pixels). In such cases, the partitioning decision shall be limited to block sizes 32×32 for the largest blocks, 8×8 for the smallest blocks, for the redimensioned sequence, so that these blocks are converted, by transposition of their respective sizes, e.g. with a scale factor equal to n, n being an integer strictly greater than 1, in block sizes 64×64 for the larger ones, to 16×16 for smaller, for the original sequence, in cases where n is equal to two. Without additional processing, the 8×8 blocks are therefore not available for the original resolution. It is certainly possible in this case to end the decision on the original resolution when a 16×16 block has been decided and thus to allow the use of 8×8 blocks if necessary. This solution still has flaws, as it assumes non direct application of the partitioning decision on the redimensioned video sequence and execution of the partitioning algorithm on the original video sequence again to allow the use of 8×8 blocks, implying a negative impact on the speed with additional processing requirements on the original video sequence as well as on the quality of coding due to the loss of coherence between decisions on the redimensioned video sequence and on the original video sequence.

In order to improve the proposed method in this specific case, in one or more embodiments, the sizes of encoding units are defined for the partitioning of the redimensioned video sequence allowing reaching by transposition according to a scale factor all the encoding block sizes provided for by the first set of encoding parameters.

In the above example, corresponding to HEVC standard, an additional encoding block size is defined, in order to obtain 8×8 pixel encoding blocks after scale transposition. In the case of redimensioning according to a scale factor of 2, a 4×4 pixel block size is hereby defined, producing 8×8 pixel blocks by transposition.

Similarly, the greatest partitioning block size is defined for the partitioning of the redimensioned video sequence so as to correspond to the largest partitioning block size provided for encoding the original video sequence (in the case of HEVC standard, 64×64 blocks) by transposing the scale factor considered for redimensioning. For example, when this scale factor is equal to two, and an encoding of the original video sequence according to the HEVC standard is desired, the encoding of the redimensioned video sequence is limited to partitioning using larger blocks of size 32×32.

This defines a second set of encoding parameters used for encoding (including partitioning) of the redimensioned video sequence, which contains a size parameter of encoding block (or, in the case of HEVC standard, of coding unit), which is not located in the first set of encoding parameters, but corresponding by scale transposition to an encoding parameter being in the first set.

In one or more embodiments, the first set of encoding parameters may therefore include a first set of partitioning parameters, and the second set of encoding parameters may include a second set of partitioning parameters, this second set of partitioning parameters being defined so as to correspond to the mathematical antecedent of the first set of partitioning parameters by scale transposition.

In the case where it is desired to encode a video sequence according to a standard, such as the HEVC standard, using the proposed method leads in one or more embodiments to modification of the set of encoding parameters according to the standard considered in order to perform the encoding of the video sequence once it is redimensioned. Obtaining normative coding, that is to say in accordance with a standard, for the original video sequence thus assumes the use of non-normative coding for the redimensioned video sequence.

Depending on the video encoding development, the motion vectors may be determined with fractional pixel accuracy, in that a motion vector may point towards a fractional pixel element generated between two adjacent pixels. In this case, the fractional samples are generated between two adjacent samples, for example by interpolation between these two samples. This is the case of HEVC standard, which provides the generation of fractional luminance samples by defining an interpolator filter with 8 coefficients for the positions of half-samples (or half-pixels) and an interpolator filter with 7 coefficients for the positions of quarter-samples (or quarter-pixels). The HEVC standard thus allows the generation of motion vectors with accuracy equal to one quarter of the distance between two luminance samples.

The use of quarter pixel accuracy for the motion vectors generated for the redimensioned version of the video sequence to be encoded, however, leads to a higher level of motion vector accuracy determined for the original version than a quarter-pixel due to the operation of transposing by homothety the motion vectors generated for the redimensioned version. For example, in the case of 4K to HD redimensioning, the motion vectors determined for the redimensioned video sequence which are transposed to be used for the original video have their components (e.g. horizontal and vertical) multiplied by a scale factor of two, so they have an accuracy of a half-pixel, rather than a quarter-pixel. This restriction, which has a non-negligible visual impact, could be circumvented by performing a refinement of the motion vector on the original resolution. However, tests have shown that it would result in an increase of encoding time which is too costly compared to the quality gain, refinement of the motion vector on the original resolution involving a determination prior to the refinement of this motion vector the original resolution.

Figure 8:
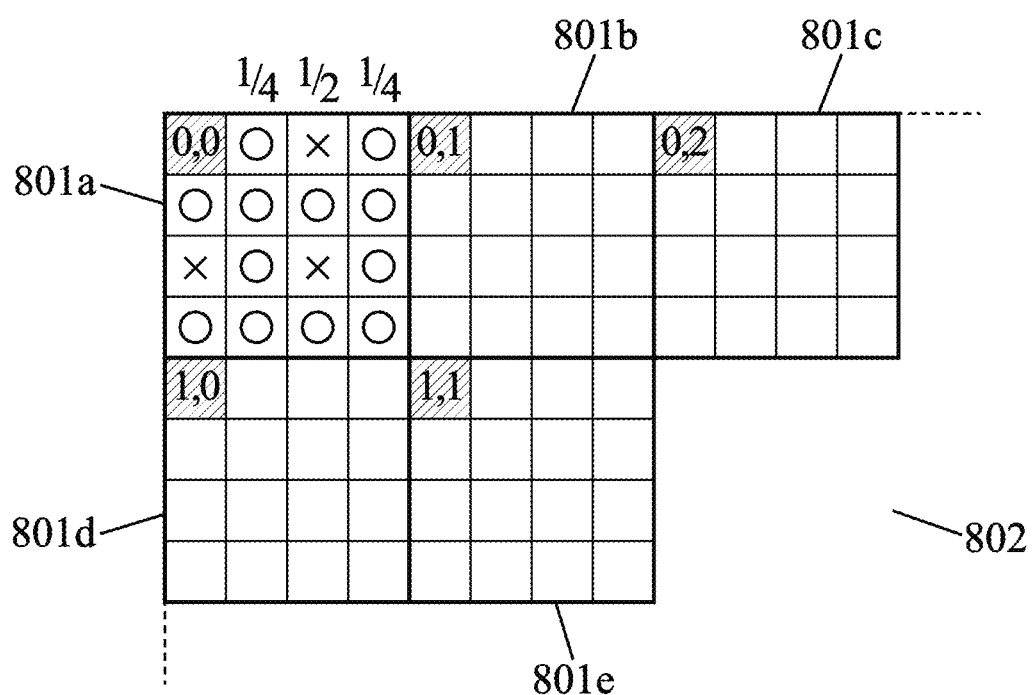
FIG. 8 is a schematic view illustrating a set of fractional pixel positions.

FIG. 8 illustrates this restriction related to the fractional accuracy of the pixel.

FIG. 8 shows five pixels (0,0), (0,1), (0,2), (1, 0), and (1, 1) (801a, 801b, 801c, 801d, 801e) of a pixel matrix (802), for example of 3840×2160 pixels in the case of a 4K format. The video encoding algorithm used may provide for the generation, for each pixel of the pixel matrix (802), half-pixels and/or quarter-pixels, in one or more directions (horizontal, vertical, diagonal), As explained above, this allows in particular the generation of motion vectors having an accuracy of a half-pixel or a quarter-pixel according to the motion estimation algorithm used.

In FIG. 8, for pixel (0,0) (801) the quarter-pixels are represented by circles, and the half-pixels are represented by crosses.

When the motion estimation algorithm used for encoding the redimensioned video sequence generates motion vectors with a level of accuracy lower than a pixel, e.g. of a quarter-pixel, and these motion vectors are transformed by scale transposition so as to be directly used for the encoding of the original video sequence without performing motion estimation again on this original video sequence, motion vectors which are transposed (by multiplying their coordinates by a factor corresponding to the scale factor used for redimensioning) have a decreased level of accuracy.

For example, in the case of redimensioning an original 4K video sequence to HD, and of a motion estimator used for video encoding the redimensioned HD video sequence generating motion vectors with quarter-pixel accuracy, the transposition of motion vectors generated for encoding of HD video sequence comprises multiplying this vector's components by a scale factor of two. Therefore, the transposed motion vectors used for encoding the 4K video sequence have half-pixel accuracy, and the positions marked with a circle in FIG. 8 are no longer reachable by these transposed motion vectors. The transposition of the motion vectors also induces resolution loss when encoding the original video.

To improve the method proposed in this specific case, in one or more embodiments, fractional positions are defined with a higher resolution than the maximum resolution provided for video encoding the original video sequence in order to reach the maximum resolution provided for video encoding the original video sequence by transposition according to the scale factor used for redimensioning.

In the example above, corresponding to HEVC standard, fractional positions are defined for eighths of pixels between two adjacent pixels, and a motion estimation algorithm for the generation of motion vectors with an accuracy of an eighth of a pixel. Thus, a motion vector pointing to a fractional position of the eighth of a pixel is transformed by scale transposition (with a scale factor of two) in a motion vector pointing to a fractional position of a quarter-pixel, compatible with the maximum fractional resolution provided by the HEVC standard.

A second set of encoding parameters is considered again for encoding according to a mode of prediction encoding by temporal correlation using a plurality of images from the video sequence (and in particular the generation of motion vectors) from the redimensioned video sequence, which contains a fractional resolution parameter, which is not found in the first set of encoding parameters, but corresponding to an encoding parameter found in this first set by scale transposition.

In one or more embodiments, the first set of encoding parameters may comprise a first set of parameters for generating fractional pixel positions and fractional resolution for generating motion vectors, and the second set of encoding parameters comprises a set of parameters for generating fractional pixel positions and fractional resolution for generating motion vectors, the second set of parameters being defined so that the maximum fractional resolution, available particularly for motion vectors, corresponds to the mathematical antecedent of the maximum fractional resolution of the first set of parameters by scale transposition.

In the case where encoding a video sequence according to a standard, such as the HEVC standard, using the proposed method is desired, it leads in one or more embodiments to modifying the set of encoding parameters according to the standard considered to perform the encoding of the video sequence once it is redimensioned. Obtaining normative coding, that is to say in accordance with a standard, for the original video sequence thus assumes the use of non-normative coding for the redimensioned video sequence.

The use of a non-normative video coding for the redimensioned video sequence may lead, in one or more embodiments, to defining one or more additional interpolation filters for generating fractional positions with a resolution higher than the maximum fractional resolution provided for by the normative coding considered. In the case of HEVC standard, the interpolation filter of the chroma component may for example be used to generate fractional positions with a resolution of an eighth of a pixel.

Other encoding parameters are affected by this restriction induced by the use of a redimensioning technique for encoding an original video sequence according to a standard.

For example, the HEVC standard does not allow bidirectional prediction for 8×4 or 4×8 blocks. In the case of a hierarchical decision made on a redimensioned video sequence, this results in loss of 16×8 and 8×16 bidirectional prediction at the original level.

The bidirectional prediction technique typically involves a weighted average of two Inter predictions. The encoder selects a set of predictive parameters for a "direction" (for a first reference image), and then for a second "direction" (for a second reference image, different from the first reference image). The encoder then determines if it retains a single one or both of the two directions, in which case an average of the two predictions generated is determined before calculating a corresponding pixel residual, which is optionally processed by transformation and quantization.

The bidirectional prediction therefore corresponds by principle to an "Inter" prediction with two predicted vectors. As a result, aspects of the method proposed for Inter prediction are applicable to bidirectional prediction.

Furthermore, given the restriction of the HEVC standard outlined above, block sizes for bidirectional prediction may, in one or more embodiments, be defined for encoding the redimensioned video sequence, so as to achieve by scale transposition according to the scale factor used for redimensioning predefined block sizes for bidirectional prediction for encoding the original video sequence.

A second set of encoding parameters is considered again for encoding according to a mode of bidirectional prediction encoding by temporal correlation using a plurality of images from the video sequence (and in particular the generation of motion vectors) from the redimensioned video sequence, which contains a block size parameter for the bidirectional prediction, which is not found in the first set of encoding parameters, but corresponding to an encoding parameter (e.g. a block size parameter for the bidirectional prediction) found in this first set by scale transposition.

Conversely, it may be necessary, in one or more embodiments, to not use, for encoding the redimensioned video sequence, one or more encoding parameters if they do not correspond by scale transposition to an encoding parameter of a given set of encoding parameters, for example according to a standard, used for encoding the original video sequence.

For example, in one or more embodiments block size parameters are not used to encode the redimensioned video sequence for bidirectional prediction if they do not correspond by scale transposition to a block size parameter for bidirectional prediction usable for encoding the original video sequence, e.g. according to a standard.

The transform block size is another example of a parameter for which some restrictions may occur.

Indeed, the HEVC standard provides for the use of a block transformation with blocks of at least 4×4 pixels. In this case, if the encoder used for encoding the redimensioned video sequence is limited to this minimum size by performing HEVC encoding, 4×4 transform units are not available for the original resolution, i.e. they are not used for encoding the original video sequence.

In order to improve the proposed method in this specific case, in one or more embodiments, transform block sizes are defined for encoding the redimensioned video sequence allowing reaching by transposition according to a scale factor all transform sizes provided for by the first set of encoding parameters.

In the example above, corresponding to HEVC standard, an additional transform size is defined, to obtain 4×4 pixel transform blocks after scale transposition. In the case of redimensioning according to a scale factor of 2, a 2×2 transform size is thus defined, which produces 4×4 pixel transform blocks by transposition.

Similarly, the largest transform size is defined for block transformation used to encode the redimensioned video sequence so as to correspond to the largest transform size for block transformation used for encoding of the original video sequence by transposition with the scale factor considered for redimensioning.

We then consider again a second set of encoding parameters, used for the encoding, which contains a parameter transform size not being not in the first set of encoding parameters, but by scale transposition of corresponding to an encoding parameter being in the first set.

A second set of encoding parameters is then considered again for the encoding (and in particular applying block transformation) of the redimensioned video sequence, which contains a block size parameter, which is not found in the first set of encoding parameters, but corresponding to an encoding parameter found in this first set by scale transposition.

In one or more embodiments, the first set of encoding parameters may comprise a first set of transform parameters, and the second set of encoding parameters may comprise a second set of transform parameters, this second set of transform parameter being defined so as to correspond to the mathematical antecedent of the first set of transform parameters by scale transposition.

Considering again the case where it is desired to encode a video sequence according to a standard, such as the HEVC standard, using the proposed method, this leads in one or more embodiments to modify the set of encoding parameters according to the standard considered in order to perform the encoding of the video sequence once it is redimensioned. Obtaining normative coding, that is to say in accordance with a standard for, the original video sequence thus assumes the use of non-normative coding for the redimensioned video sequence.

Depending on the chosen embodiment, certain acts, actions, events, or functions of each of the methods described herein may be performed or occur in an order different from the one in which they were described, or may be added, merged, or not be performed or not occur, as the case may be. Furthermore, in some embodiments, some acts, actions, or events are performed or occur concurrently and not successively.

Although described through a number of detailed exemplary embodiments, the proposed encoding method and the equipment for implementing the method comprise various variants, modifications, and improvements which will become apparent to those skilled in the art, provided that these variants, modifications, and improvements are part of the scope of the invention as defined by the following claims. Moreover, various aspects and characteristics described above may be implemented together or separately, or substituted for each other, and all the various combinations and sub-combinations of the aspects and characteristics are part of the scope of the invention. Furthermore, it is possible that some of the systems and equipment described above do not incorporate all of the modules and functions described for the preferred embodiments.

The invention claimed is:

1. A method of encoding a first set of images of a video sequence according to a first set of encoding parameters, comprising:
   reducing a size of images of the first set of images, according to a scale factor, to generate a redimensioned second set of images;
   generating, for each image of the redimensioned second set of images, second encoding data according to a second set of encoding parameters separate from said first set of encoding parameters, said second encoding data including second partitioning data defining a second partitioning of the image of the redimensioned second set of images into second encoding blocks, and second predictive coding data of the second encoding blocks resulting from the second partitioning;
   generating, for each image of the first set of images, first encoding data by performing scale transposition based on said scale factor on the second encoding data of a corresponding image in the redimensioned second set of images, the generated first encoding data including first partitioning data defining a partitioning of the image of the first set of images into first encoding blocks and first predictive coding data of the first encoding blocks;
   determining, for at least one encoding block of an image of the first set of images, pixel residuals representing a distance between pixels of the at least one encoding block and pixels of a prediction block of the at least one encoding block, wherein the prediction block of the at least one encoding block is determined from predictive coding data generated for the at least one encoding block by scale transposition of the second encoding data;
   applying, for the at least one encoding block of the image of the first set of images, a block transformation to the pixel residuals determined for the at least one encoding block; and
   inserting the block transformed pixel residuals and the first encoding data in a binary encoding stream of the first set of images,
   wherein the second set of encoding parameters contains at least one second parameter which is not in the first set of encoding parameters, and
   wherein the second set of encoding parameters comprises at least one first parameter corresponding to a scale transposition according to said scale factor applied to the at least one second parameter.

2. The method of encoding according to claim 1, wherein the method further comprises:
   determining, according to a set of partitioning parameters included in the second set of encoding parameters, a partitioning of a current image into encoding blocks, and generating the second partitioning data depending on the determined partitioning,
   and wherein the first partitioning data is determined by applying scale transposition to the second partitioning data.

3. The method of encoding according to claim 1, wherein the method further comprises:
   for each encoding block derived from a partitioning of a current image, determining, according to a set of predictive coding parameters, a predictive coding mode, and generating the second predictive coding data depending on the determined coding mode; and
   determining the first predictive coding data by applying scale transposition to the second predictive coding data.

4. The method of encoding according to claim 1, wherein the second encoding data further comprises, for a current image of the redimensioned second set of images, block transformation data, and
   wherein the method further comprises:
   for each encoding block derived from a partitioning of the current image, selecting, in a set of block transformation parameters, block transformation parameters for applying a block transform to the encoding block, and generating first block transformation data depending on the selected transformation parameter;
   determining, for each encoding block of each image of the first set of images, second block transformation data by applying scale transposition, depending on the scale factor, to the first block transformation data; and
   applying, on the determined pixel residuals for the encoding block, the block transformation depending on the second block transformation data.

5. The method of encoding according to claim 1, wherein the second set of encoding parameters comprises a set of partitioning parameters, a set of predictive coding parameters, a set of coding parameters for bidirectional prediction by temporal correlation, and a set of block transformation parameters, and
   wherein the second set of encoding parameters comprises at least one second parameter from the partitioning parameters, the predictive coding parameters, the coding parameters for bidirectional prediction by temporal correlation, and the block transformation parameters, which is not in the first set of encoding parameters, the first set of encoding parameters comprising at least one first parameter corresponding to a scale transposition depending on the scale factor applied to the second parameter.

6. The method of encoding according to claim 1, wherein the second parameter is a partitioning parameter related to the minimum size of the encoding blocks used for defining a partitioning.

7. The method of encoding according to claim 1, wherein the second parameter is a predictive coding parameter according to the coding mode for prediction by motion compensation using the motion vector pointing to a separate image of the current image and the redimensioned second set of images with a precision of an eighth of a pixel.

8. The method of encoding according to claim 1, wherein the second parameter is a block transformation parameter related to the minimum block size usable for performing the block transformation of an encoding block.

9. The method of encoding according to claim 1, wherein the second parameter is a block size parameter according to a coding mode of motion compensation bidirectional predictive type and using the first and second motion vectors pointing to first and second separate images of a current image in the redimensioned second set of images, respectively.

10. The method of encoding according to claim 1, wherein the first set of encoding parameters corresponds to an encoding of the first set of images according to High Efficient Video Coding (HVEC) standard.

11. A device that encodes a first set of images of a video sequence according to a first encoding parameter set, comprising:
an input interface configured for receiving the first set of images of the video sequence; and
a video stream encoder, that comprises a controller operationally coupled to the input interface and configured to encode the first set of images according to the first set of encoding parameters using the method according to claim 1.

12. A non-transitory computer readable storage medium having a program recorded thereon, which is executable by a computer and comprises a data set representing one or more programs, said one or more programs comprising instructions that, upon execution of said one or more programs by a computer comprising a processing unit operationally coupled to memory means and to an input/output interface module, causes the computer to encode a first set of images of a video sequence according to a first set of encoding parameters according to the method according to claim 1.

13. A data set representing, via a compression or encoding path, the computer program stored on the non-transitory computer readable storage medium according to claim 12.

* * * * *